Aug. 11, 1959 L. W. BURCH 2,899,512

SWITCH MECHANISM

Filed Dec. 13, 1956 10 Sheets-Sheet 1

Inventor,
Lyndon W. Burch,
by William W. Soltow Jr.
Att'y.

Inventor,
Lyndon W. Burch,
by William W. Soltow Jr.
Atty.

Fig. 16.
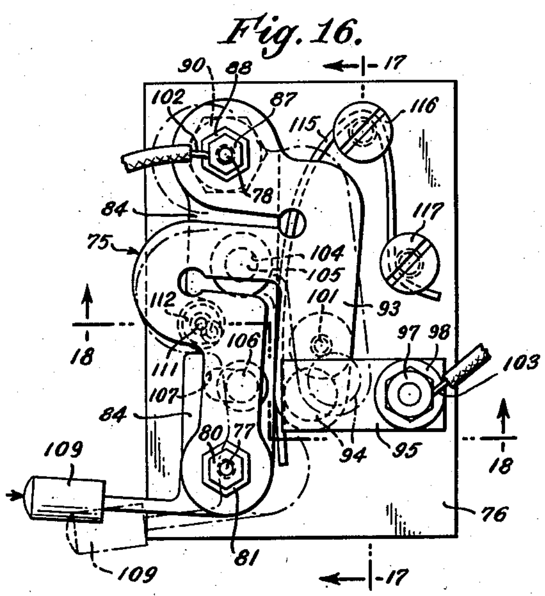
Fig. 17.
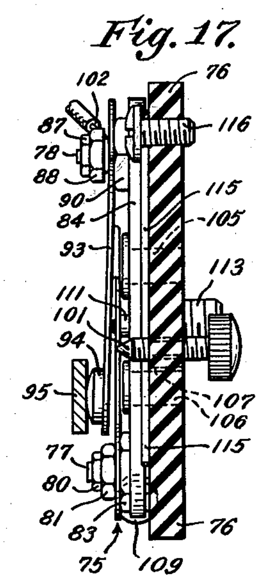
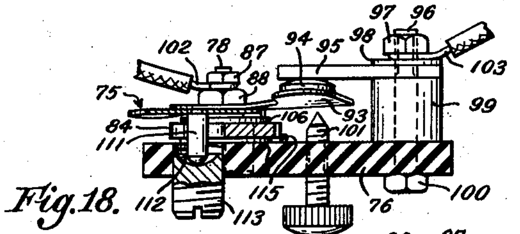
Fig. 18. Fig. 20.
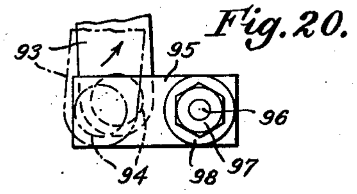
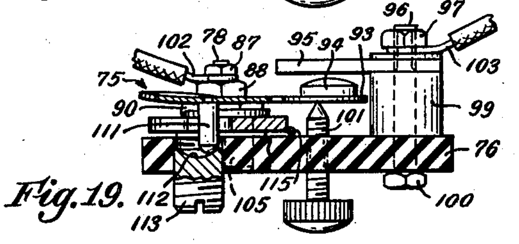
Fig. 19. Fig. 21.
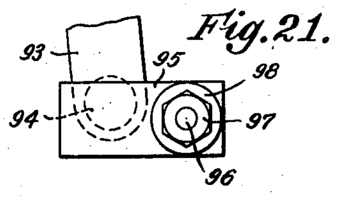
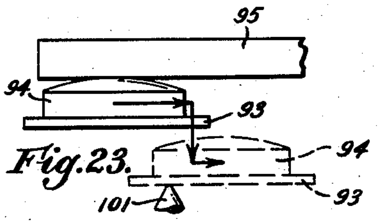
Fig. 23. Fig. 25.
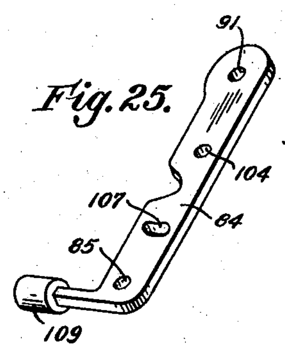
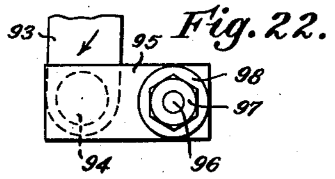
Fig. 22. Fig. 24.
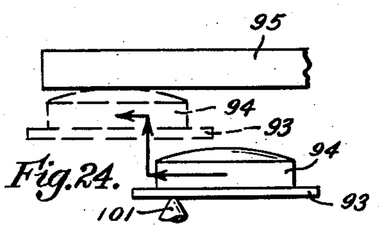
Inventor,
Lyndon W. Burch,
by William W. Soltow Jr.
Att'y.

Inventor,
Lyndon W. Burch,
by William W. Soltow Jr.
Att'y.

Aug. 11, 1959 L. W. BURCH 2,899,512

SWITCH MECHANISM

Filed Dec. 13, 1956 10 Sheets-Sheet 5

Inventor,
Lyndon W. Burch,
by William W. Soltow Jr.
Att'y.

Inventor,
Lyndon W. Burch,
by William W. Soltow Jr.
Atty.

SWITCH MECHANISM

Filed Dec. 13, 1956

Inventor,
Lyndon W. Burch,
by William M. Soltow Jr.
Att'y.

Fig. 48.
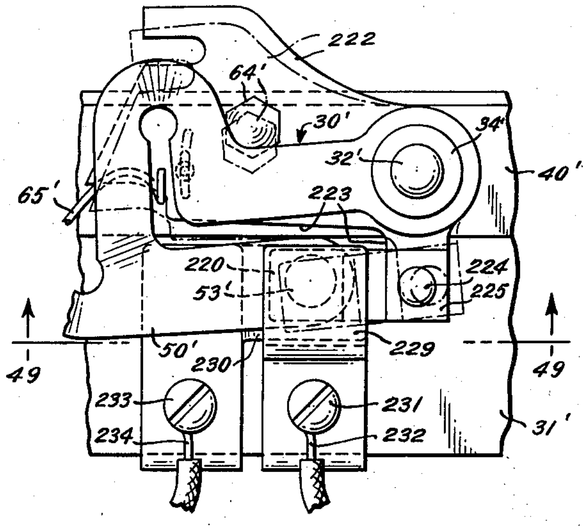
Fig. 50.
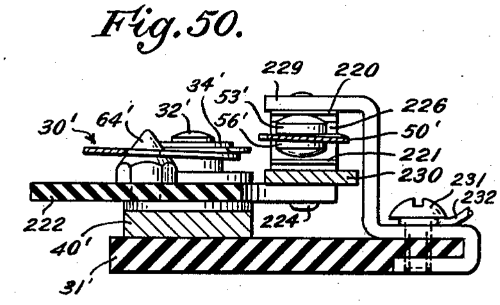
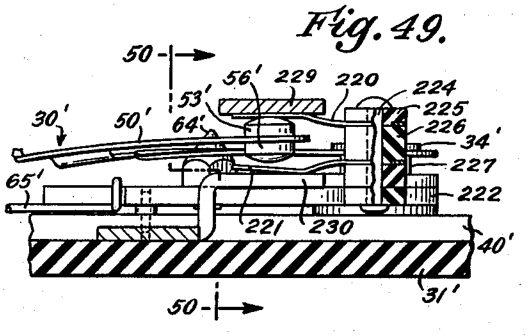
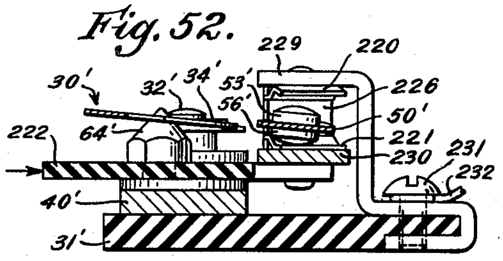
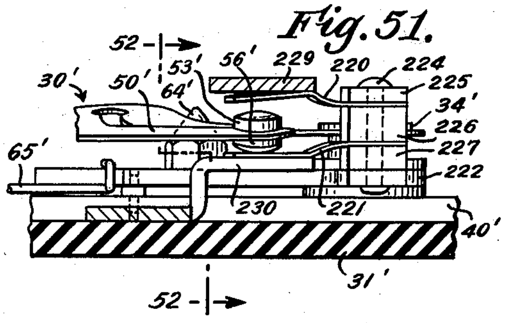
Inventor,
Lyndon W. Burch,
by William W. Soltow Jr.
Atty.

Aug. 11, 1959 L. W. BURCH 2,899,512

SWITCH MECHANISM

Filed Dec. 13, 1956 10 Sheets-Sheet 9

Inventor,
Lyndon W. Burch,
by William W. Soltow Jr.
Atty.

Inventor,
Lyndon W. Burch,
by William W. Soltow Jr.
Atty.

2,899,512

SWITCH MECHANISM

Lyndon W. Burch, Boston, Mass., assignor to Texas Instruments Incorporated, a corporation of Delaware Application December 13, 1956, Serial No. 628,185

25 Claims. (Cl. 200—67)

This invention relates to electrical switches. More particularly, this invention relates to electrical switches embodying a spring member which is readily flexible in a first path or direction and is substantially non-flexible or stiff in a path or direction perpendicular to said first path or direction.

To render the spring member readily flexible and substantially non-flexible in these respective paths or directions, the spring member is preferably formed with a high width-to-thickness ratio. Thereby, the spring member is readily flexible in a path or direction perpendicular to its width and is substantially non-flexible in a path or direction perpendicular to the path or direction in which it is readily flexible. The spring member is operatively associated with at least one electrical contact so that flexure of the spring member in or along said substantially flexible plane is effective to move that contact into and out of engagement with at least one other electrical contact.

With an electrical switch including a spring member operatively associated with an electrical contact as set forth above, the problem of separating the contacts if they should become welded or otherwise stuck together often becomes critical. It will be clear that since the spring member is flexible in the direction of its movement to make and break the contacts, any force applied to this spring member to effect such movement of the contacts, in most cases, is not efficiently transmitted through the spring member. For example, if a first contact which was carried at one end of a spring member became stuck to another contact, it might be exceedingly difficult, if not impossible, to pull or break the first contact away from the other by means of a force applied to a remote region of the spring member and in a direction in which the spring member is flexible.

The invention has particular adaptability to electrical switches embodying a snap-acting mechanism which includes such a spring member. The invention includes those snap-acting mechanisms in which the spring member may itself be a snap-acting member or a portion of such a snap-acting member; it may be carried by said snap-acting member as an integral part thereof or extension secured thereto; or it may be a member separate from the snap-acting member but operatively connected thereto, mechanically or otherwise, to be actuated thereby.

It is a normal characteristic of an electrical switch embodying a snap-acting mechanism that when the snap-acting mechanism is manipulated to snap the movable contact out of engagement with another member, the snap-acting mechanism approaches and passes through an unstable neutral condition. The closer the snap-acting mechanism approaches this neutral condition, the less the force is that it exerts tending to maintain the movable contact against the member; to the end that when it reaches this neutral condition it ordinarily exerts no force tending to maintain the movable contact against the member or tending to move the movable contact away from the member. That is, at the instant the snap-acting mechanism starts to snap, no appreciable force is ordinarily transmitted by it to the contact which is moved thereby. The result is that whenever the contact which is moved in response to snapping of the snap-acting mechanism is disposed in engagement with another contact, and the snap-acting mechanism approaches and reaches this unstable neutral condition, there may be substantially no pressure urging the contacts together. With little or no force urging the contacts together, among other deleterious effects, the electrical resistance between the contacts increases and an incipient arc may form between the contacts which could produce sufficient heat to weld the contacts together.

It will be seen then that in those instances where a contact which is movable for make and break is associated with a spring member or a snap-acting mechanism as described above, and particularly in those instances where the snap-acting mechanism includes a spring member associated with such a contact, the problems involved are of pronounced concern. As noted above, the snap-acting mechanism includes the spring member in those cases where the spring member and the snap-acting member are one and the same; where the spring member is a portion of the snap-acting member, or is carried thereby as an integral part thereof or an extension thereto; and where the spring member is separate from the snap-acting member but is operatively associated therewith.

An object of this invention is to provide an improved electrical switch which is automatically effective, when actuated, to break apart or separate two or more of its contacts if they should become welded or otherwise stuck together.

A further object of this invention is to provide an improved electrical switch which is automatically effective to counteract the tendency of its contacts to become welded together.

A further object of this invention is to provide a novel electrical switch wherein at least one of its contacts is movable laterally relative to a contact with which it cooperates for make and break of an electrically conductive path. A further object of this invention is to provide a novel snap-acting switch wherein at least a portion of the force, under which said lateral relative movement is effected, is independent of the force exerted by snapping of the snap-acting mechanism of the switch.

A further object of this invention is to provide a novel snap-acting switch which is effective, during actuation thereof, to take up or reduce a tendency for one of its contacts to creep away from a cooperating contact in one direction without decreasing the extent of snap movement of said one contact in the opposite direction.

A further object of this invention is to provide a novel snap-acting switch which is effective to counteract or to reverse a tendency toward loss of pressure between these contacts.

Among further objects of this invention may be noted the provision of a novel electrical switch which, when actuated, is automatically and inherently effective to wipe its contacts one against another to maintain at least a portion of their surfaces in a constanly clean state free from the presence of sulfides, oxides and other foreign matter or material;

A further object of this invention is to provide a novel electrical switch which has a minimum number of complicating parts, which is compact, durable, efficient, easy to calibrate and adjust, economical to manufacture and dependable in operation.

Other objects will be in part obvious and in part pointed out hereinafter.

The invention accordingly comprises the elements, and combinations of elements, features of construction, and arrangements of parts which will be exemplified in the structures hereinafter described, and the scope of the application of which will be indicated in the following claims.

In the accompanying drawing, in which several of the various possible embodiments of the invention are illustrated:

Fig. 16 is a plan view of an electrical switch forming a second embodiment of this invention, the parts being shown in full lines at the fully released position and in broken lines at the position of full throw of the actuating means;

Fig. 17 is a sectional view taken along line 17—17 in Fig. 16;

Fig. 18 is a sectional view taken along line 18—18 in Fig. 16;

Fig. 19 is a view similar to Fig. 18 but showing the parts in their respective positions at full throw of the actuating means;

Figs. 20–22 are fragmentary plan views of the electrical contacts of the switch shown in Fig. 16 and showing the relationship of the respective contacts at several positions of movement;

Figs. 23 and 24 are more or less diagrammatic views based on Figs. 18 and 19 but on an enlarged scale and showing the relationship of the respective contacts at several positions of movement, the path of movement of a substantially central point of one of the contacts being depicted by arrows in these views;

Fig. 25 is an isometric view of the actuating member of the electrical switch shown in Fig. 16;

Figure 43:
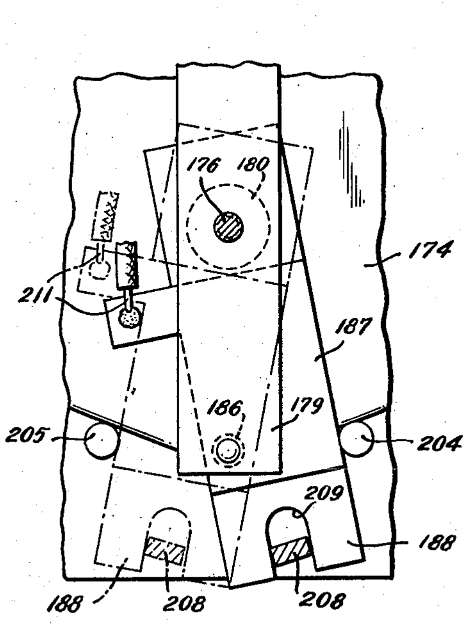
Fig. 43 is a fragmentary sectional view taken along line 43—43 in Fig. 42, one of the electrical contacts and its mounting means being shown in broken lines at the opposite extreme position of pivotal movement from that shown in full lines in Figs. 42 and 43.
Figure 44:
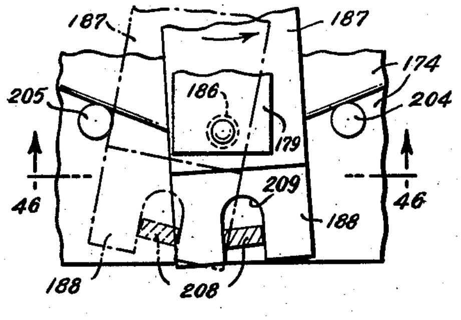
Figure 45:
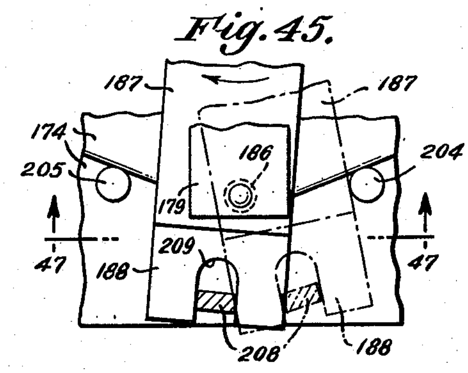
Figure 46:
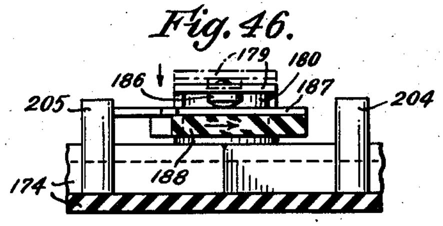
Figure 47:
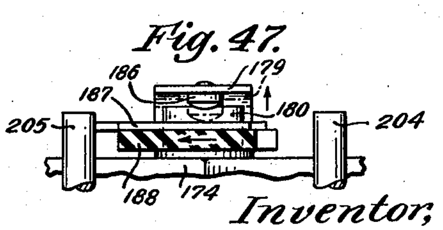
Figure 53:
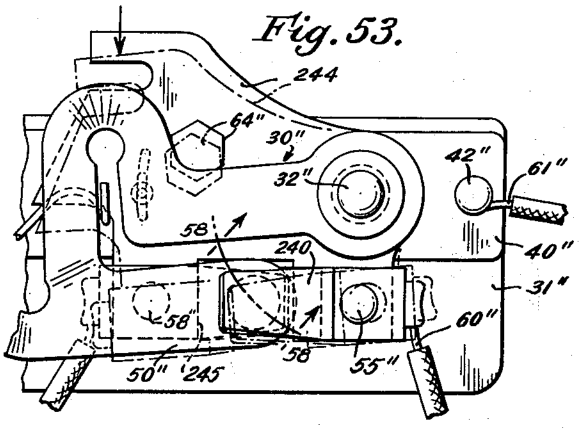
Figure 55:
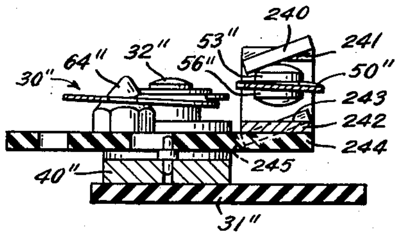
Figure 54:
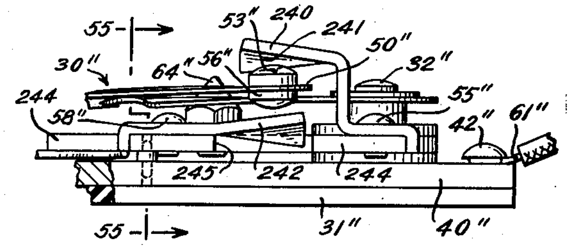
Figure 57:
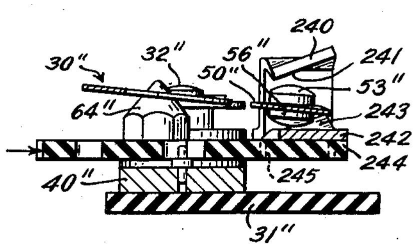
Figure 56:
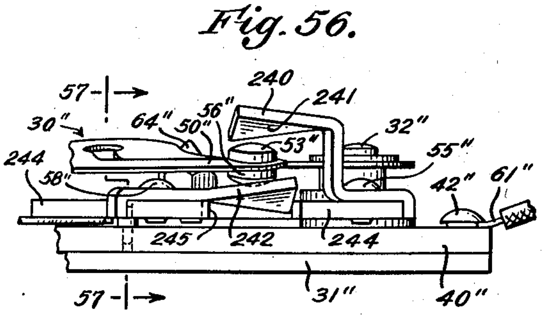
Figure 58:
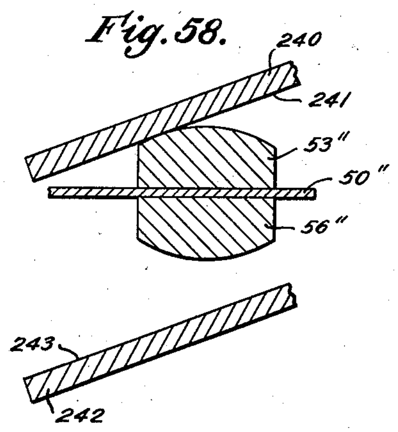
Figure 59:
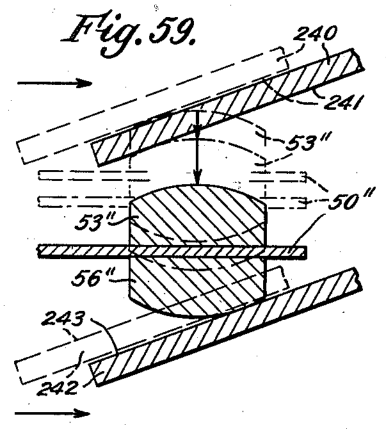
Figure 62:
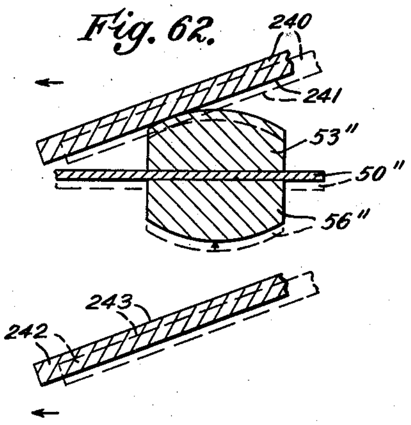
Figure 60:
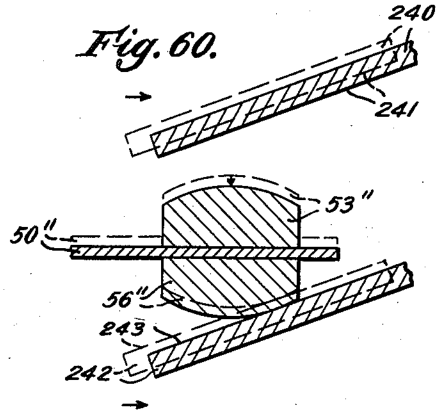
Figure 61:
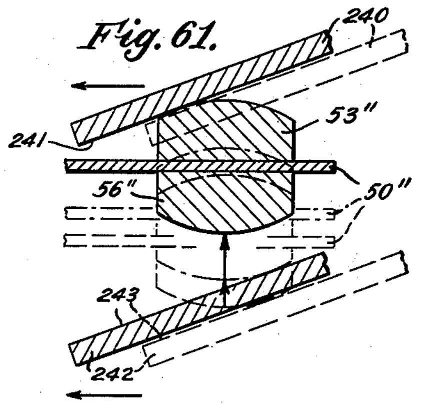

Fig. 44 is a fragmentary view corresponding to Fig. 43 but showing a portion of one of the electrical contacts and its mounting means in broken lines at the broken-line, extreme pivotal position shown in Fig. 43 and in full lines at the position during movement from this extreme pivotal position toward the opposite extreme pivotal position at which the other electrical contact snaps into engagement with said one contact;

Fig. 45 is a fragmentary view similar to Fig. 44 but showing a portion of one of the electrical contacts and its mounting means in broken lines at the full-line, extreme pivotal position shown in Fig. 43 and in full lines at the position during movement from this extreme pivotal position toward the opposite extreme pivotal position at which the other electrical contact snaps out of engagement with said one contact;

Figs. 46 and 47 are sectional views taken along line 46—46 in Fig. 44 and line 47—47 in Fig. 45, respectively, and showing the parts in broken lines just before and in full lines just after snapping of the electrical contact which is snapped in response to snapping of the snap-acting mechanism;

Fig. 48 is a fragmentary view showing the modified parts of the embodiment of Figs. 1–15 according to a first modification which can be applied to each of the embodiments shown in the drawings, these parts being shown in full lines at one extreme position of relative movement and in broken lines at the opposite extreme position of relative movement;

Fig. 49 is a sectional view taken along line 49—49 in Fig. 48;

Fig. 50 is a sectional view taken along line 50—50 in Fig. 49;

Fig. 51 is a view similar to Fig. 49 but showing the contacts which are snapped in response to snapping of the snap-acting mechanism in the opposite extreme position from that shown in Fig. 49;

Fig. 52 is a sectional view taken along line 52—52 in Fig. 51;

Fig. 53 is a fragmentary view showing the modified parts of the embodiment of Figs. 1–15 according to a second modification which can be applied to each of the embodiments shown in the drawings, these parts being shown in full lines in one extreme position of relative movement and in broken lines in the opposite extreme position of relative movement;

Fig. 54 is a fragmentary front view of a portion of the modified switch as shown in full lines in Fig. 53;

Fig. 55 is a sectional view taken along line 55—55 in Fig. 54;

Fig. 56 is a view similar to Fig. 54 but showing the contacts which are snapped in response to snapping of the snap-acting mechanism in the opposite extreme position from that shown in Fig. 54;

Fig. 57 is a sectional view taken along line 57—57 in Fig. 56;

Fig. 58 is a more or less diagrammatic sectional view taken substantially along the line 58—58 in Fig. 53, but being on an enlarged scale;

Fig. 59 is a view similar to Fig. 58 but showing the parts in broken lines at the initial position of relative movement shown in Fig. 58 and showing the parts in full lines at their position of relative movement (in the respective directions indicated by the arrows) immediately after snapping of the inner contacts in response to snapping of the snap-acting mechanism, the inner contacts also being shown in broken lines immediately prior to snapping thereof in response to snapping of the snap-acting mechanism;

Fig. 60 is a view similar to Fig. 58 but showing the parts in broken lines at the position of relative movement shown in full lines in Fig. 59 and showing the parts in full lines at the position of relative movement of the parts after full throw of the actuating means which effects movement of the parts in the respective directions indicated by the arrows in this figure and in Fig. 59;

Fig. 61 is a view similar to Fig. 58 but showing the parts in broken lines at the position of relative movement shown in full lines in Fig. 60 and showing the parts in full lines at their position of relative movement (in the respective directions indicated by the arrows) immediately after snapping of the inner contacts in response to snapping of the snap-acting mechanism, the inner contacts also being shown in broken lines immediately prior to snapping thereof in response to snapping of the snap-acting mechanism; and Fig. 62 is a view similar to Fig. 58 but showing the parts in broken lines at the position of relative movement shown in full lines in Fig. 61 and showing the parts in full lines at the extreme position of relative movement in the directions indicated by the arrows in this figure and in Fig. 61.

Similar reference characters indicate like parts throughout the several views of the drawing.

The term "contact" as used throughout this specification is intended to encompass any means which is engageable and disengageable with another means for the purpose of providing an electrically conductive path when these two means are mutually engaged and for disrupting that path when these two means are mutually disengaged. By way of example it is pointed out that, whereas the electrical contacts disclosed herein which are moved for make and break purposes by a spring member comprise, in some instances, structure in addition to the spring member, an equivalent arrangement would be to eliminate this additional structure whereby the portion of the spring member which would then engage and disengage a cooperating contact would provide the contact-forming structure.

*Embodiment of Figs. 1–15*

Referring to the drawings, the snap-acting mechanism of the embodiment shown in Figs. 1–15 includes a double-looped, snap-acting member generally indicated by the reference numeral 30. Snap-acting member 30 is formed of a strip of springy material such as Phosphor-bronze, beryllium-copper, or spring-steel and has a high width-to-thickness ratio. Member 30 may be, for example, twenty to twenty-five times wider than it is thick. Snap-acting member 30 is secured adjacent each of its ends to base 31 by means of studs 32, 33. Base 31 of this embodiment, as well as the base of each of the other embodiment disclosed herein, is formed of a suitable electrically insulating material such as one of the customary molded plastics, ceramics, etc. Stud 32 passes through washer 34, an aperture in snap-acting member 30, washer 36, an aperture 37 (see Fig. 7) in member 38, washer 39, and is fixedly secured to and supported by member 40. Stud 33 passes through an aperture in washer 44, through an aperture in snap-acting member 30, in threaded engagement with a nut 47, and is fixedly secured to and supported by member 40. Supporting member 40 is fixedly supported on base 31 by means such as rivets 41 and 42. The spacing of studs 32 and 33 with respect to each other is such that the opposite ends of snap-acting member 30 are forcibly urged away from each other to put member 30 in tension. The end of snap-acting member 30 adjacent stud 33 is permanently secured upwardly (as viewed in Fig. 2) and out of the normal plane of the snap-acting member thereby to warp it to a first condition in the manner clearly set forth in United States Patent 2,630,504, granted March 3, 1953 to L. W. Burch et al. (see particularly Figs. 17 and 20 of this patent). Reference is hereby made to this patent for the details of construction and function of this snap-acting member.

Figure 1:
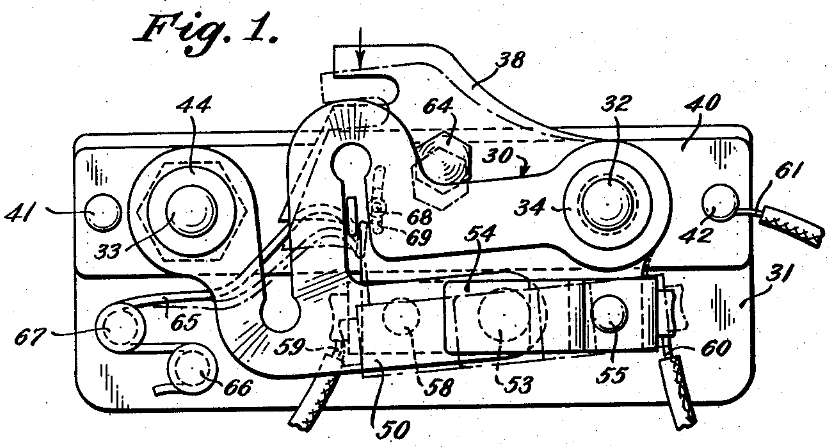
Fig. 1 is a plan view of an electrical switch forming one embodiment of this invention, the parts being shown in full lines at the fully released position and in broken lines at the position of full throw of the actuating means.

The snap-acting mechanism of this embodiment further includes a member 50 integral with snap-acting member 30 as shown in Fig. 1 or otherwise fixedly secured thereto. In this instance, member 50 is formed of springy material, which may be the same material of which snap-acting member 30 is formed, and has a high width-to-thickness ratio. Accordingly, member 50 is readily flexible in opposite directions along a plane perpendicular to its width and is substantially non-flexible in a plurality of opposite directions along the plane in which member 50 lies. This last-mentioned plane is disposed at a substantial angle with respect to said plane along which member 50 is readily flexible, namely: 90°. Thus, where, as in this instance, both member 50 and member 30 are flexible in one plane, and non-flexible in a plane substantially at 90° thereto, the composite structure of these two members can be considered as a spring member. However, if desired, member 50 may be non-flexible, in which case member 30 may be considered as the spring member. In any event, it will be apparent as this description proceeds that snapping of the snap-acting mechanism of this embodiment, as well as that of each of the embodiments described herein, results in flexure of the spring member for making and breaking movement of at least one electrical contact.

Figure 2:
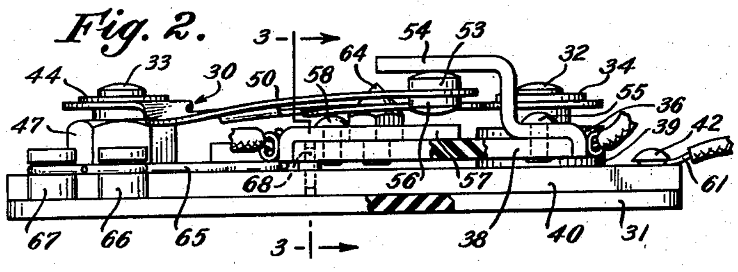
Fig. 2 is a front view of the electrical switch shown in Fig. 1.
Figure 3:
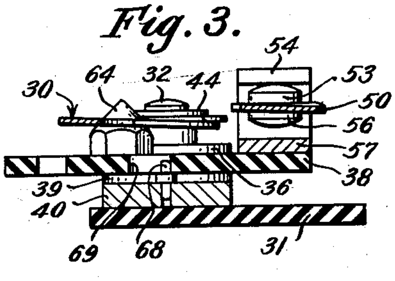
Fig. 3 is a sectional view taken along line 3—3 in Fig. 2.
Figure 4:
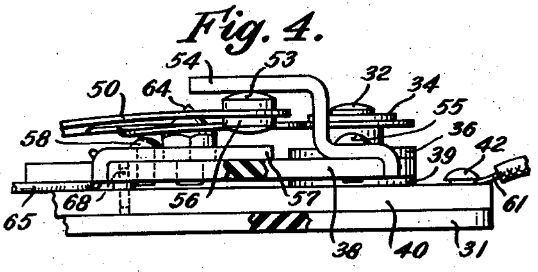
Fig. 4 is a fragmentary front view of the electrical switch shown in Fig. 1, several of the electrical leads shown in Fig. 1 being removed as is the case in certain other figures throughout the drawing for purposes of clarity of illustration.
Figure 5:
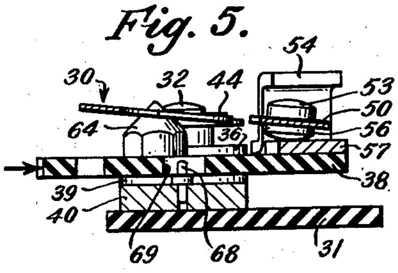
Fig. 5 is a view similar to Fig. 3 but showing the parts in their respective positions at full throw of the actuating means.
Figure 6:
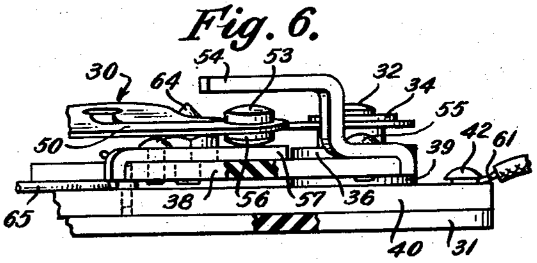
Fig. 6 is a view similar to Fig. 4 but showing the parts in their respective positions at full throw of the actuating means.
Figure 8:
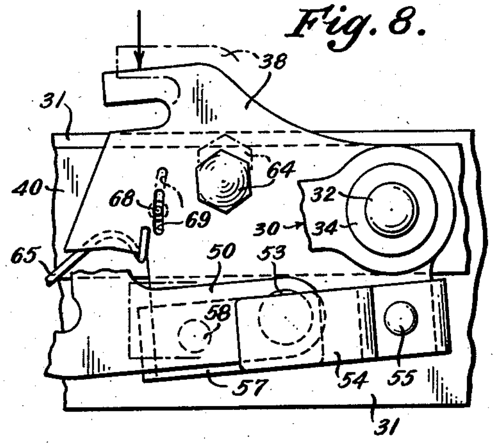
Fig. 8 is a fragmentary plan view of the switch shown in Fig. 1 with a portion of the snap-acting element being broken away for purposes of clarity of illustration, the parts being shown in full lines at full throw of the actuating means and a portion of the actuating means being shown in broken lines at fully released position.
Figure 7:
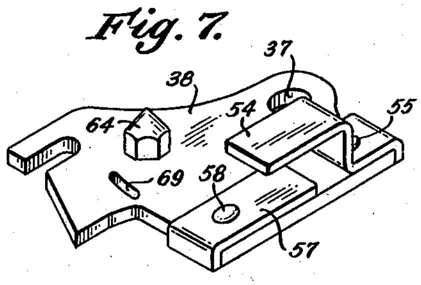
Fig. 7 is an isometric view on a scale slightly reduced from that of Figs. 1–6 and showing the actuating member along with the electrical contacts carried thereby.
Figure 12:
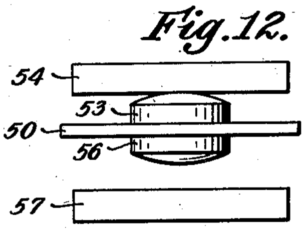
Figs. 12–15 are more or less diagrammatic views based on Figs. 3 and 5 and on an enlarged scale, these views showing the relationship of the respective contacts at several positions of movement.
Figure 9:
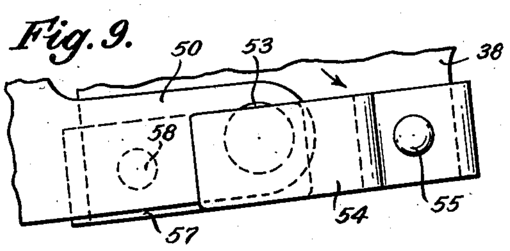
Figs. 9–11 are fragmentary plan views of the electrical contacts of the switch shown in Fig. 1, these views being on a scale slightly enlarged over that of Fig. 1 and showing the relationship of the respective contacts at several positions of movement.

The free end of member 50 carries an electrical contact 53 for cooperation with an electrical contact 54. Contact 54 is fixedly secured to member 38 by means of a rivet 55 or any other equivalent means. The free end of member 50 also carries an electrical contact 56 for cooperation with another electrical contact 57. Contact 57 is fixedly secured to member 38 by means such as a rivet 58. Electrical leads 59 and 60 may be connected to contacts 57 and 54, respectively, as shown in Fig. 1 in any suitable manner such as by welding. Stud 33 supports the end of snap-acting member 30 adjacent thereto a slight distance above the normal plane of member 30 whereby member 30, in the position of the parts shown in Figs. 2–4, is biased to a first condition. With the parts in this first condition, snap-acting member 30 urges the free end of member 50 upwardly resiliently to urge contact 53 into engagement with and against cooperating contact 54 and resiliently to urge contact 56 out of engagement with and away from cooperating contact 57. Snap-acting member 30 is snappable, by means later to be described, from this first condition to a second condition whereby the free end of member 50 is quickly moved downwardly to snap contact 53 out of engagement with contact 54 and to snap contact 56 into engagement with contact 57. Also, the snap-acting mechanism of this embodiment is snappable from said second condition back to said first condition whereby contact 56 is snapped out of engagement with contact 57 and contact 53 is snapped into engagement with contact 54. As shown in Figs. 1, 2 and 4, an electrical lead 61 may be secured against member 40 by rivet 42 whereby snap-acting element and contacts 53 and 56 are electrically connected to lead 61.

It will be clear that either set of the above-described cooperating contacts could be eliminated if the function of these contacts were not desired or required. For example, an insulating piece could be substituted for either of contacts 53 or 54 in which event the switch would be merely a single-throw switch rather than a double-throw switch as shown in Figs. 1–15. Alternatively, of course, an insulating piece could be substituted for either of contacts 56 or 57 in the same manner as described above with respect to contacts 53 and 54.

A pin 68 is fixed to member 40 and rides in a slot 69 which is provided in member 38. Member 38, along with washers 34 and 36, is pivotable about stud 32 between limits fixed by the engagement of pin 68 with the opposite ends of slot 69.

The switch of this embodiment may be provided with a spring 65 secured to base 31 by studs 66 and 67 and having a portion abutting member 38 pivotally to bias member 38 to the position shown in full lines in Fig. 1. With this arrangement, member 38 can be pivoted downwardly from the full-line position shown in Fig. 1 in response to a downwardly applied force against member 38 and can then be pivoted upwardly by merely releasing this applied force to permit spring 65 to return member 38 back to the full-line position shown in Fig. 1. Alternatively, spring 65 and studs 66 and 67 could be eliminated from the switch whereby member 38 could be returned back to the full-line position shown in Fig. 1 manually or by a different force-applying means. In any event, member 38 is pivotable in each of two opposite directions in response to an applied force corresponding to that direction.

In this embodiment, the means for effecting snapping of the snap-acting mechanism from said first condition to said second condition and from said second condition to said first condition includes a cam 64 carried by member 38. When member 38, in response to or under an applied force, is moved downwardly as viewed in full lines in Fig. 1, cam 64 is moved against the relatively adjacent portion of snap-acting member 30 whereby a portion of this applied force is utilized to elevate that adjacent portion and thereby effect snapping of the snap-acting member from said first condition to said second condition. Also, when member 38, in response to or under a force applied by spring member 65 or other means, is moved upwardly as viewed in Fig. 1, cam 64 is moved away from said relatively adjacent portion of snap-acting member 30 to permit that relatively adjacent portion to move downwardly and thereby effect snapping of the snap-acting member from said second condition to said first condition.

Since contacts 54 and 57 are fixed with respect to member 38, they are laterally moved in an arcuate path relative to contacts 53 and 56, respectively, in response to or under the corresponding applied force which effects pivotal movement of member 38 in each of the two opposite directions. The parts of this embodiment, and each of the other exemplary embodiments disclosed herein, are so constructed and arranged that the snap-acting mechanism is snapped from one of said conditions to the other during the corresponding laterally relative movement of the respective cooperating contacts. It is noted that the path of the laterally relative movement of the contacts lies at a substantial angle to the direction of movement of the contacts between their make and break positions.

Figure 13:
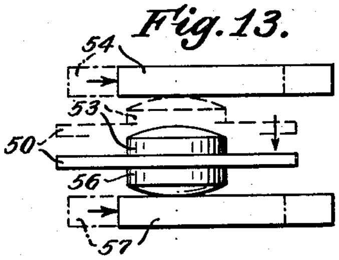
Figure 10:
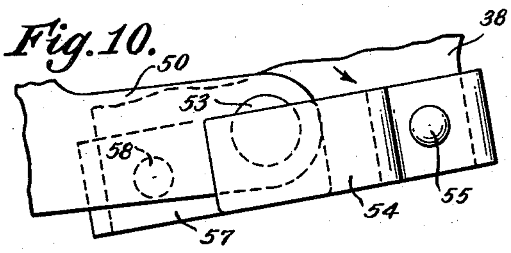
Figure 14:
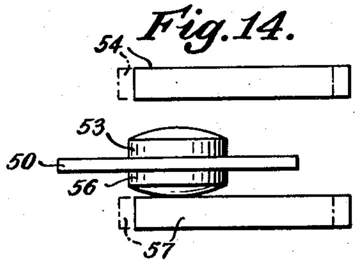
Figure 11:
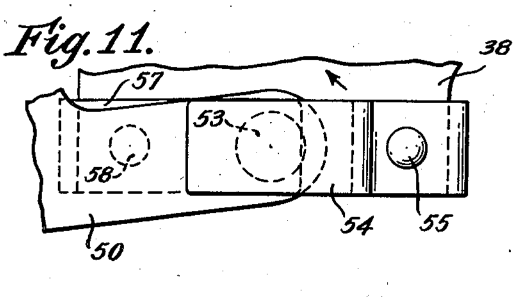
Figure 15:
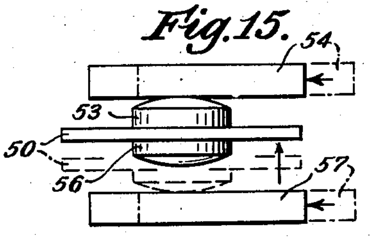

A preferred arrangement of the parts of this embodiment provides substantially the operational seqence depicted in Figs. 3–6 and 8–15. It will be noted that the respective dotted-line positions of the contacts as shown in each of Figs. 13–15 are the same as the corresponding full-line positions of these contacts in the respective, immediately preceding figure. During downward pivotal movement of member 38 from the full-line position shown in Fig. 1, the snap-acting mechanism will be snapped from said first condition to said second condition at substantially the relative position of member 50 and contacts 54 and 57 indicated in full lines in Figs. 9 and 13. Slot 69 and pin 68 permit further relative movement of contacts 54 and 57 relative to member 50 to substantially the position shown in full lines in Figs. 10 and 14. During this further relative movement the snap-acting mechanism, of course, remains in said second condition. During return movement or movement in the opposite direction of contacts 54 and 57, cam 64 will be released from the relatively adjacent portion of snap-acting member 30 to permit the latter to snap from said second condition to said first condition at substantially the relative position of the parts shown in Figs. 11 and 15. Continued relative movement of contacts 54 and 57 in this direction with respect to member 50, will bring the parts back to the relative position shown in full lines in Figs. 1, 12 and 15. During this continued relative movement snap-acting member 30, of course, will remain in said first condition.

Accordingly, it is apparent that contacts 54 and 57 are movable laterally in an arcuate path relative to contacts 53 and 56 before, at and after snapping of the snap-acting mechanism in both of the opposite directions of pivotal movement of member 38. Also, it is apparent that the path of the laterally relative movement between the cooperating contacts of each of the respective pairs is disposed at a substantial angle to the direction of relative movement of these contacts between their mutually engaged and mutually disengaged positions.

When either of contacts 53 or 56 is engaged with but not stuck to its cooperating contact 54 or 57, respectively, the above-described laterally relative movement between these mutually engaged contacts results in a frictional force between these contacts. In this embodiment, as well as in each of the embodiments disclosed herein, at least a portion of this frictional force acts on and is resisted by the spring member in a plane or direction in which it is substantially non-flexible. In the same manner, when either of contacts 53 or 56 is welded or otherwise stuck to its cooperating contact 54 or 57, respectively, any attempt to move one of these contacts laterally relative to the other results in a force between these contacts which likewise acts on and is resisted by the spring member in a plane or direction in which the spring member is substantially non-flexible. Since at least a portion of the resulting force between the mutually engaged contacts is resisted by the spring member in a plane or direction in which the spring member is substantially non-flexible, at least a portion of the force applied to actuate the switch will be effective acting through the spring member to overcome the force between the contacts. It follows that since the spring member resists this portion of resulting force rather than yielding thereunder by flexing, a weld which might have formed between the contacts will be broken or sheared apart and the switch will remain in operative condition. Of course, any other sticking effect between the contacts will be alleviated in the same manner.

It will be apparent, as this description proceeds, that the same holds true for each of the other embodiments set forth herein.

Furthermore, any tendency for a weld to form between two cooperating contacts is counteracted inherently by this improved switch due to the laterally relative movement between the contacts. This result obtains for the reasons that the contacts tend to wipe themselves clean of any molten metal therebetween, the contacts continually present relatively cool surfaces to each other during the intervals in which arcing may occur, and, as is obvious, a weld will not form between parts so long as they are moving relative to each other.

Another important advantage which flows from this invention is that the laterally relative movement of the cooperating contacts, which takes place each time the switch is actuated, results in the contacts wiping and abrading themselves against each other whereby a constantly clean surface, free of sulfides, oxides and other foreign material, is presented by each contact to the contact with which it cooperates for make and break.

Still another important advantage of this improved switch is that the force under which the contacts are moved laterally relative to each other is independent of the force exerted by snapping of the snap-acting member. Obviously, the force exerted on the contacts by snapping of the snap-acting member is limited, whereas with the switch of this invention, the force available for the laterally relative movement of the contacts is not so limited.

As the description proceeds, it will become apparent that each of the advantages pointed out above is provided by each of the respective exemplary embodiments set forth herein.

*Embodiment of Figs. 16–25*

In the embodiment shown in Figs. 16–25, the snap-acting mechanism includes a snap-acting member generally indicated by the reference numeral 75 and which is of the same form and structure as snap-acting member 30 of the previously described embodiment. Snap-acting member 75 is supported in tension on base 76 by means of studs 77 and 78. Base 76 is formed of a suitable insulating material such as one of the customary molded plastics, ceramics, etc. Stud 77 threadedly engages lock nut 80 and nut 81, passes through an aperture (not shown) in snap-acting member 75, through a nut 83 and into fixed engagement in an aperture 85 (see Fig. 25) in a supporting member 84. Stud 78 threadedly engages lock nut 87 and nut 88, passes through an aperture (not shown) in snap-acting member 75, through a nut 90 and into fixed engagement in an aperture 91 (see Fig. 25) in supporting member 84. A member 93, in this instance made of springy material and having a high width-to-thickness ratio, is formed integral with snap-acting member 75 in the same manner as with the previously described embodiment. (If desired, as explained for the Figs. 1–15 embodiment, member 93 may be non-flexible.) An electrical contact 94 is carried by the free end of member 93 for movement into and out of engagement with another electrical contact 95. Contact 95 is supported in fixed relation to base 76 by means of a stud 96 which passes in threaded engagement through nut 97, through an aperture in washer 98, through an aperture (not shown) in contact 95, through an aperture in spacer member 99, and is secured to base 76 by means of nut 100. Electrical leads 102 and 103 may be suitably secured between nut 88 and lock nut 87 and between nut 97 and washer 98, respectively. An adjustable stop member 101 is threadedly engaged with base 76 and limits the extent of movement of the free end of member 93 away from contact 95.

Stud 78 supports the end of snap-acting member 75 adjacent thereto at a slight distance above the normal plane of the latter. The effect is that snap-acting member 75 is warped in the manner clearly described in the above-mentioned patent whereby it is disposed in a first condition resiliently to bias contact 94 against contact 95 as shown in Figs. 17 and 18. Snap-acting member 75 is snappable (by means to be described later in this description) from said first condition to a second condition whereby contact 94 is snapped from the position shown in Figs. 17 and 18 to the position at which it is disengaged from contact 95 and the opposite side of member 93 is resiliently biased against stop 101 as shown in Fig. 19. It will be obvious that an electrical contact could be substituted for stop member 101 which could cooperate with another contact carried at the underside of the free end of member 93 whereby the switch would be of the double-throw type. Furthermore, if an electrical contact were substituted for stop member 101, obviously, an electrically insulating piece could be substituted for either of contacts 94 or 95.

Since member 93 is formed of springy material and has a high width-to-thickness ratio, it is readily flexible in opposite directions along a plane perpendicular to its width and is substantially non-flexible in a plurality of opposite directions along the plane in which member 93 lies. Thus, this substantially non-flexible plane is disposed at a substantial angle with respect to said plane along which member 93 is readily flexible and since the latter is substantially flat, the angular relation of these planes in this embodiment is 90°.

A stud 105 passes through an aperture 104 (see Fig. 25) in supporting member 84 and is fixedly secured to base 76. Pivotal movement of supporting member 84 along with snap-acting member 75 about stud 105 is limited in opposite directions by means of a pin 106 which is fixed to base 76 and alternately engageable with the ends of slot 107 in supporting member 84. The snap-acting mechanism of this embodiment includes an extension or cam-following member 111. Cam-following member 111 is carried by snap-acting member 75 for cooperation with a cam surface 112 provided by an adjusting screw 113 which threadedly engages base 76. Snap-acting member 75 is pivotable about stud 105 by applying a force against extension 109 in the direction of the arrow in Fig. 16. Since member 93 is integral with snap-acting member 75, this pivotal movement of extension 109 is effective to move contact 94 laterally relative to contact 95 along an arcuate path in a plane lying at a substantial angle to the direction of movement of contact 94 in its movement between make and break positions. A spring 115 is supported on base 76 by means of studs 116 and 117. A portion of spring 115 bears against the right-hand side of member 84 as viewed in Fig. 16 whereby snap-acting member 75 is resiliently biased to the full-line position shown in Fig. 16. Therefore, upon release of the force applied against extension 109, spring 115 applies sufficient force to return member 93 and snap-acting member 75 back to the full-line position shown in Fig. 16. Of course, spring 115, along with studs 116 and 117, could be eliminated whereby snap-acting member 75 would remain in any pivotal position to which it was moved and could be returned by any desired force-applying means. In either case, member 84 along with snap-acting member 75, is pivotable in opposite directions in response to or under a corresponding applied force.

When a force is applied against extension 109 by which snap-acting member 75 is pivoted in a counterclockwise direction as viewed in Fig. 16, cam surface 112 cooperates with cam follower 111 whereby the latter applies a force against or to snap-acting member 75 to snap the snap-acting member from said first condition to said second condition. Also, when a force is applied (by spring 115 or otherwise) to pivot snap-acting member 75 in a clockwise direction as viewed in Fig. 16, the force exerted through cam follower 111 against the snap-acting member is released, permitting the snap-acting member to snap back to said second condition from said first condition. When contact 94 is engaged with contact 95, laterally relative movement between these contacts, of course, results in a frictional force between these contacts. At least a portion of the frictional force between contacts 94 and 95 acts on and is resisted by member 93 in a direction along the above-mentioned plane in which member 93 is substantially non-flexible. It is clear, then, that the laterally relative movement between contacts 94 and 95 of this embodiment has substantially the same effect as the laterally relative movement between the contacts of each of the cooperating sets described above with respect to the embodiment shown in Figs. 1–15. Therefore, the same functions and effects attributed to this previously described embodiment are provided by this last-described embodiment. That is, for example, any tendency for contact 94 to become welded to contact 95 is counteracted; if a weld or other sticking effect should form between these two cooperating contacts, it will be effectively broken; the contacts will maintain themselves in a constantly clean state by their wiping action; and the force under which the contacts are moved laterally relative to each other is independent of that exerted by snapping of the snap-acting member.

When the actuating means is in fully released position, contacts 94 and 95 will be in the full-line position shown in Fig. 16 and in the broken-line position shown in Fig. 20. When the actuating means has been moved from this released position to the position at which contact 94 snaps away from contact 95, the relative position of these contacts will be as shown in full lines in Fig. 20. When the actuating means is swung to the extreme counterclockwise position, contacts 94 and 95 will be in the broken-line position shown in Fig. 16 and the full-line position shown in Fig. 21. When the actuating means has been moved from this extreme counterclockwise position to the position at which contact 94 snaps back into engagement with contact 95, the relative position of these contacts will be as shown in Fig. 22. Continued movement of the actuating means back to the fully released position of the latter brings the contacts back to the full-line position shown in Fig. 16. The more or less diagrammatic views shown in Figs. 23 and 24 clearly depict the relative movement of contacts 94 and 95. Both of these figures are views taken in the direction of Figs. 18 and 19, and the arrows therein indicate the path of movement of a substantially central point on contact 94. Fig. 23 shows the movement of contact 94 during actuation of the actuating means from the fully released position to the extreme counterclockwise position. Fig. 24 shows the movement of contact 94 during actuation of the actuating means from the extreme counterclockwise position back to the fully released position.

It will be noted that in this embodiment, as well as in each of the embodiments disclosed herein, the path of the laterally relative movement between the cooperating contacts is disposed at a substantial angle to the path of relative movement of the contacts between their make and break positions. In many installations this angle will be substantially 90° for optimum results. However, it will be clear to those skilled in the art that this angle may vary within substantial limits.

*Embodiments of Figs. 26–37*

The snap-acting mechanism of the embodiment illustrated in Figs. 26–37 includes a conventional snap-acting member generally indicated by the reference numeral 125. Snap-acting member 125 is formed of springy material such as that described for the previous embodiments and has a high width-to-thickness ratio. Such a member is shown in United States Patent 1,960,020, granted May 22, 1934 to P. K. McGall. Snap-acting member 125 includes three legs 126, 127 and 128, each of which is integral at one end with each of the others at a transverse portion 129. Leg 127 is substantially longer than each of the other legs and one end thereof is tightly secured between a U-shaped member 131 and a nut 132. Screw 133 is in threaded engagement with nut 132, passes through an aperture in leg 127 and thence passes into threaded engagement with U-shaped member 131. Nut 132 is tightened down against the adjacent surface of leg 127 fixedly to secure that leg to U-shaped member 131. The end of each of legs 126 and 128 distal from portion 129 of snap-acting member 125 is disposed in engagement with a groove presented by the relatively adjacent end of the respective leg of U-shaped member 131 whereby the snap-acting member is biased to a first condition, wherein the arrangement of the parts is such that each of legs 126 and 128 is bowed downwardly as viewed in Fig. 27 to place center leg 127 in tension. The result is that, with snap-acting member 125 in said first condition, portion 129 of snap-acting member 125 is resiliently biased upwardly to the position shown in Fig. 27.

In this embodiment, leg 127 is the spring member which is included in the snap-acting mechanism. Since spring member 127 has a high width-to-thickness ratio and is formed of springy material, it is readily flexible in a plane perpendicular to its width and is substantially non-flexible in the plane in which the spring member lies. The angular relation of these planes in this embodiment is 90°. It is noted that transverse portion 129 and the relatively adjacent, integral portions of legs 126 and 128 reinforce spring member 127 against flexure in the plane in which the spring member lies but freely permit flexure in the above-mentioned plane perpendicular to its width.

Figure 31:
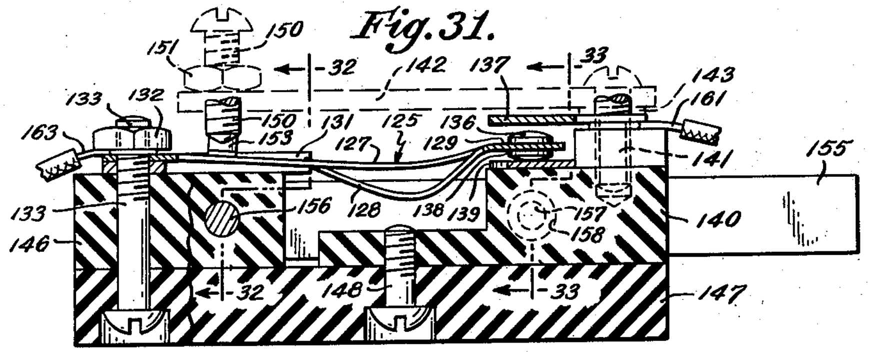
Fig. 31 is a sectional view taken along line 31—31 in Fig. 30.
Figure 32:
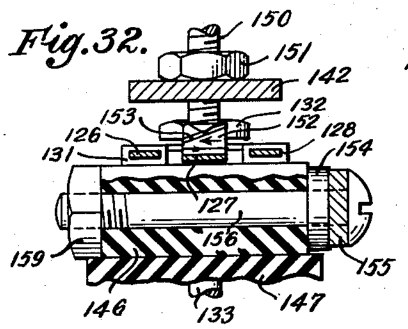
Fig. 32 is a sectional view taken along line 32—32 in Fig. 31.

Portion 129 which forms the free end of spring member 125 carries an electrical contact 136 for cooperation with electrical contact 137 and an electrical contact 138 for cooperation with electrical contact 139. Contact 137 is secured to supporting member 140 by means of a screw 141 which passes through respective apertures in member 142, insulating piece 143 and contact 137, and thence into tightened threaded engagement with supporting member 140. Contact 139 is secured to supporting member 140 by means of a screw 145 which passes through an aperture in contact 139 and thence into tightened threaded engagement with supporting member 140. Supporting member 140 is fixedly secured to base 147 by means such as screws 148 and 149. With the snap-acting mechanism in the above-mentioned first condition, portion 129 of snap-acting member 125 is biased to the upward position shown in Fig. 27 whereby contact 136 is resiliently engaged with contact 137 and contact 138 is separated from contact 139. Snap-acting member 125 is snappable, by means later to be described, from said first condition to a second condition whereby electrical contact 136 is separated from contact 137 and contact 138 is resiliently engaged with contact 139 as shown in Fig. 31. In a manner similar to that previously pointed out with respect to the previously described embodiments, an insulating piece could be substituted for any one of contacts 136, 137, 138 and 139 whereby the device would operate as a single-throw switch rather than a double-throw switch.

The shank of screw 133 passes loosely through an aperture in a supporting member 146 and loosely through base 147 whereby supporting member 146 is pivotally mounted about screw 133 for pivotal movement with respect to base 147. The shank of screw 133 also passes through an aperture in the end of leg 127, and nut 132 retains the parts through which the shank of screws 133 extends.

The free end of member 142 supports a post in the form of a screw 150 which threadedly engages an aperture in member 142 and is secured by lock nut 151. The end of screw 150 opposite from the head coacts with a cam 152 which presents an inclined-plane surface 153 to the adjacent end of screw 150 for cooperation therewith.

Supporting member 146, along with the parts fixed with respect thereto, may be conveniently pivoted with respect to the base and the parts fixed with respect thereto by means of a handle 155. Handle 155 is secured to supporting member 146 by means of a screw 156 which passes through an aperture in handle 155, through washer 154, through an aperture in supporting member 146 and into tightened threaded engagement with nut 159. A screw 157 is threaded in tightened engagement with an aperture in handle 155 and has a portion disposed in a hole 158 provided by supporting member 140. A coil spring 160 abuts supporting member 140 at one end and the adjacent portion of handle 155 at its other end resiliently to bias handle 155, along with supporting member 146, to the position shown in Fig. 26. Coil spring 160 could be eliminated from the device in which case supporting member 146 would no longer be biased to this position but would be pivoted in the counterclockwise direction as viewed in Figs. 26 and 30 by a different force-applying means.

Electrical leads 161 and 162 may be electrically connected to contacts 137 and 139, respectively, by disposing these leads between the respective contact and the adjacent portion of supporting member 140. Electrical lead 163 may be electrically connected to contacts 136 and 138 by clamping this lead between nut 132 and the adjacent portion of snap-acting member 125.

Figure 26:
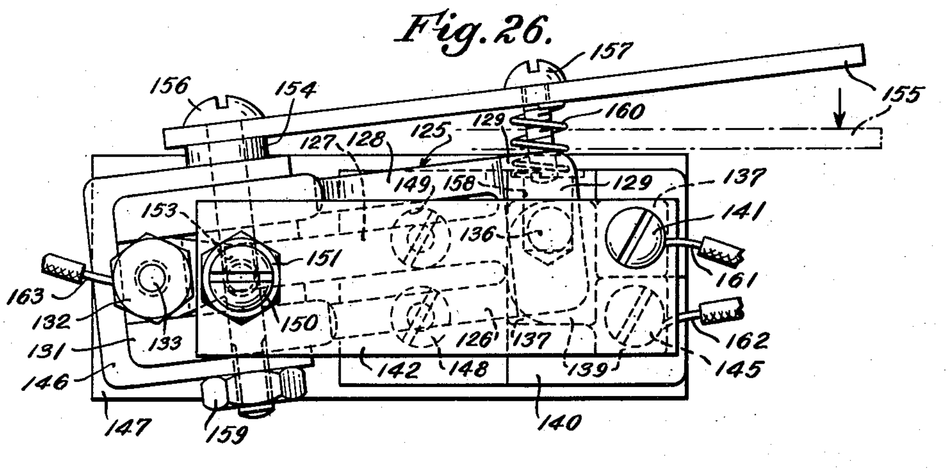
Fig. 26 is a plan view of an electrical switch forming a third embodiment of this invention, the parts being shown in full lines at the fully released position and in broken lines at the position of full throw of the actuating means.
Figure 27:
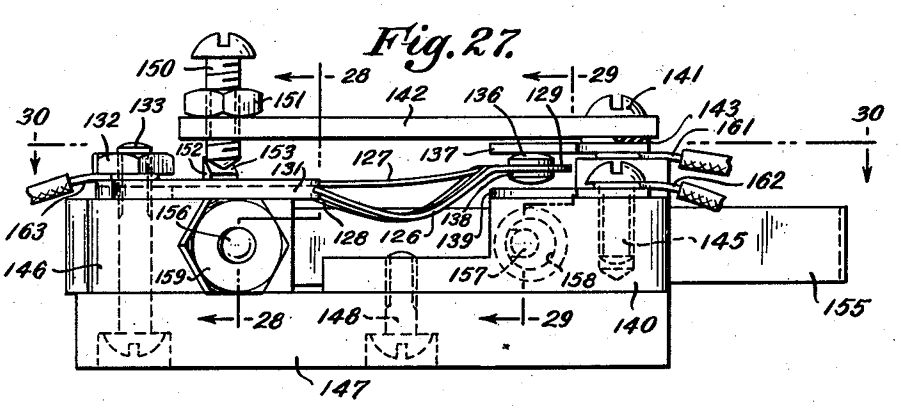
Fig. 27 is a front view of the electrical switch shown in Fig. 26.
Figure 28:
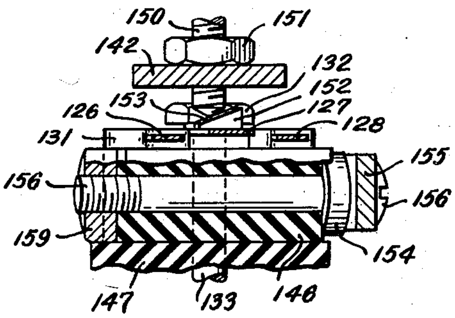
Fig. 28 is a fragmentary sectional view taken along line 28—28 in Fig. 27.
Figure 29:
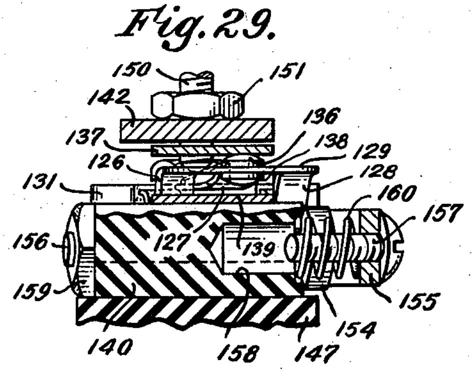
Fig. 29 is a fragmentary sectional view taken along line 29—29 in Fig. 27.
Figure 30:
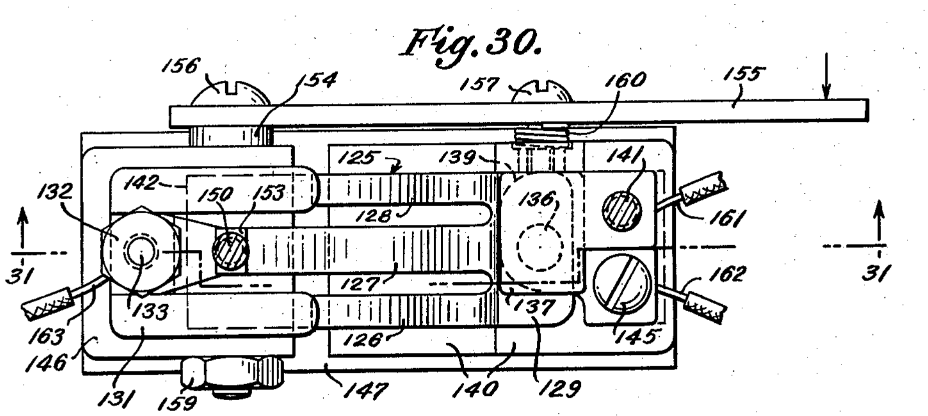
Fig. 30 is a sectional view taken along line 30—30 in Fig. 27 but showing the parts in their respective positions at full throw of the actuating means.

Under a force applied against handle 155, in the direction of the arrows in Figs. 26 and 30, supporting member 146 may be pivoted from the full-line position shown in Fig. 26 to the position shown in Fig. 30. During this pivotal movement inclined surface 153 of cam 152 coacts with screw 150 to depress the relatively adjacent portion of leg 127 of snap-acting member 125. The effect is that at substantially the full-line position of the parts shown in Fig. 36, the snap-acting mechanism snaps from said first condition to said second condition thereby to snap contact 136 out of engagement with contact 137 and to snap contact 138 into engagement with contact 139. It is apparent, then, that a portion of the force applied to pivot supporting member 146 in a clockwise direction as viewed in Figs. 26 and 30 is also utilized to snap snap-acting member 125 from said first condition to said second condition. Also, when a force is applied, by coil spring 160 or otherwise, to pivot supporting member 146 in a counterclockwise direction, the force exerted by member 150 against cam 152 is released thereby permitting snap-acting member 125 to snap from said second condition back to said first condition. Since snap-acting member 125 is secured to supporting member 146, each of contacts 136 and 138 will be concomitantly moved laterally relative to contacts 137 and 139, respectively, in an arcuate path in a direction lying in a plane disposed at a substantial angle to the direction of movement of contacts 136 and 138 during make and break. This angle in this embodiment is 90°. The parts of this embodiment, as well as those of each of the other embodiments disclosed herein, are constructed and arranged so that the snap-acting mechanism snaps during said laterally relative movement of the respective contacts and under the corresponding force applied to move the contacts laterally relative to each other.

When either of contacts 136 or 138 is engaged with its respective cooperating contact 137 or 139, laterally relative movement between the mutually engaged contacts results in a frictional force between these contacts. At least a portion of the frictional force between these contacts acts on and is resisted by the spring member in a direction along the above-mentioned plane in which it is substantially non-flexible. The result is that all of the above-noted advantages and novel functions of the previously described embodiments are also provided by this embodiment.

Figure 36:
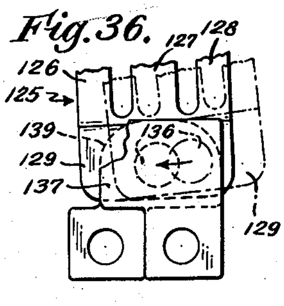
Figs. 36 and 37 are fragmentary plan views of the electrical contacts and mounting means therefor as shown in Fig. 33 but showing the relationship of the respective contacts at several positions of movement.
Figure 37:
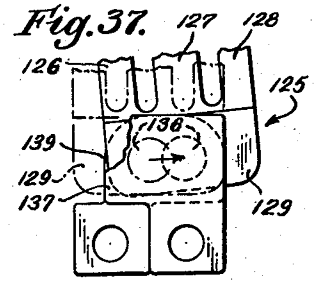
Figure 33:
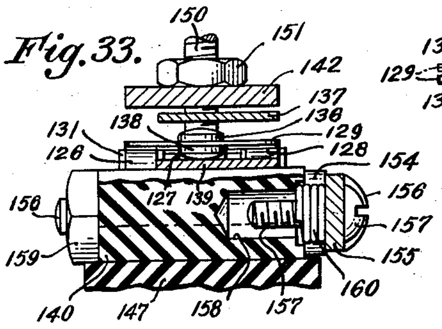
Fig. 33 is a sectional view taken along line 33—33 in Fig. 31.
Figure 34:
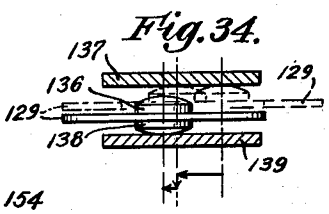
Figs. 34 and 35 are more or less diagrammatic views based on Fig. 33 but on an enlarged scale and indicating the relationship of the respective contacts at several positions of movement.
Figure 35:
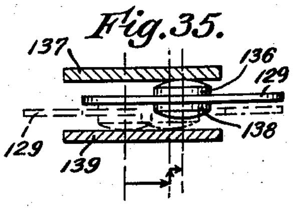

Figs. 26–29 show the relationship of the parts of this embodiment when the actuating means thereof is in its fully released position. Also, a fragmentary portion of snap-acting member 125 is indicated in dotted lines in Fig. 36 when this member is in the full-line relationship shown in Figs. 26–29. Fig. 36 also shows this fragmentary portion of snap-acting member 125 in full lines in its relationship to contacts 137 and 139 immediately after snapping of the snap-acting mechanism during pivotal movement of spring member 127 from the position shown in Figs. 26–29 to the fully swung position shown in Figs. 30–33. Figs. 30–33 show the relationship of the parts of this embodiment when the handle 155 has been swung to its fully clockwise position (as viewed in Fig. 30). Also, Fig. 37 shows a fragmentary portion of member 125 in dotted lines at its position with respect to contacts 137 and 139 when the switch parts are in the relationship shown in Figs. 30–33. Fig. 37 also shows this fragmentary portion of snap-acting member 125 in full lines at or just after snapping of the snap-acting mechanism during pivotal movement of spring member 127 from the position shown in Figs. 30–33 to the position shown in Figs. 26–29. The larger arrow in each of Figs. 34 and 35 indicates the extent of movement of a substantially central point on either of contacts 136 or 138 during movement thereof from the broken-line to the full-line position shown in Figs. 36 and 37, respectively. The smaller of the two arrows in each of Figs. 34 and 35 indicates the extent of continued movement of this substantially central point in the direction indicated by both of the arrows.

*Embodiment of Figs. 38–47*

The snap-acting mechanism of the embodiment illustrated in Figs. 34–47 includes a snap-acting disc 170. Disc 170 is formed of springy material such as described for the previous embodiments, and may take the form described in United States Patent 1,895,591, granted January 31, 1933 to J. A. Spencer. The disc is preferably of the monometallic, mechanically-snappable type. The radially inner portion of snap-acting disc 170 is corrugated and the radially outer portion thereof is substantially flat.

Figure 40:
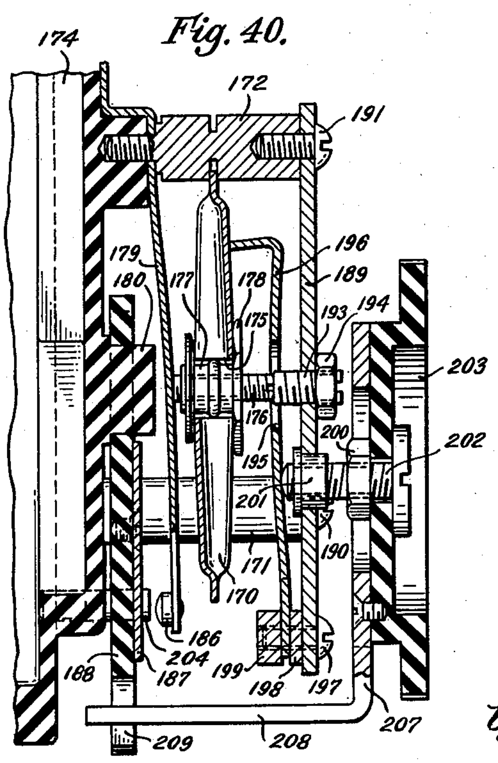
Fig. 40 is a sectional view taken along line 40—40 in Fig. 38 but on an enlarged scale.
Figure 41:
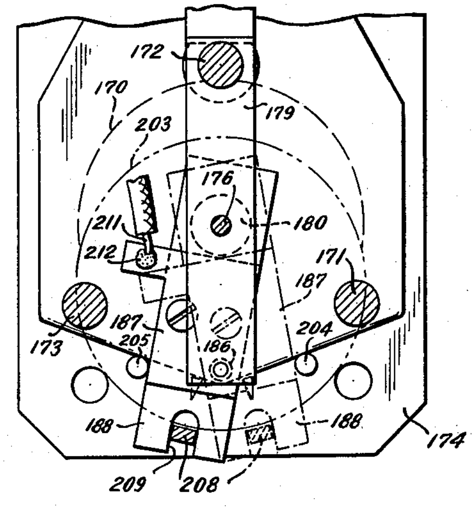
Fig. 41 is a sectional view taken along line 41—41 in Fig. 39.

Suitably supported on base 174 in fixed relation thereto are three spaced apart columns 171, 172 and 173, respectively. Each of these columns provides a groove which receives a peripheral portion of disc 170 to support this peripheral portion in fixed relation to base 174. Disc 170 has a central opening 175 through which a threaded stud 176 extends. A flanged plug 177 is in threaded engagement with stud 176 and the plug is retained for movement with this stud by means of nut 178. In this regard, nut 178 is in threaded engagement on stud 176 and acts as a lock nut fixedly to secure plug 177 on the stud. Also, as is apparent in Figs. 40 and 42, the central portion of disc 170 is retained between nut 178 and the flange carried by plug 177 for movement with the latter and with stud 176. The radially inner portion of disc 170 initially has a conical conformation extending upwardly as viewed in Fig. 40. Disc 170 is snappable, by means later to be described, from this position as illustrated in Fig. 40 at which it is in a first condition, to a second condition at which the said inner portion of the disc along with stud 176 is snapped to the leftward position shown in Fig. 42.

Figure 39:
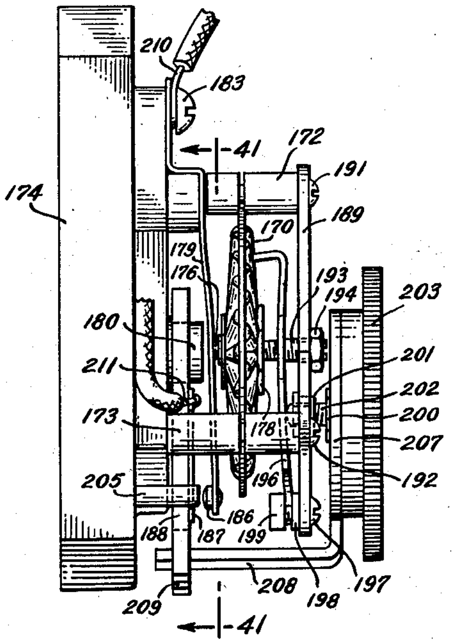
Fig. 39 is a view taken from the left-hand side of Fig. 38.
Figure 38:
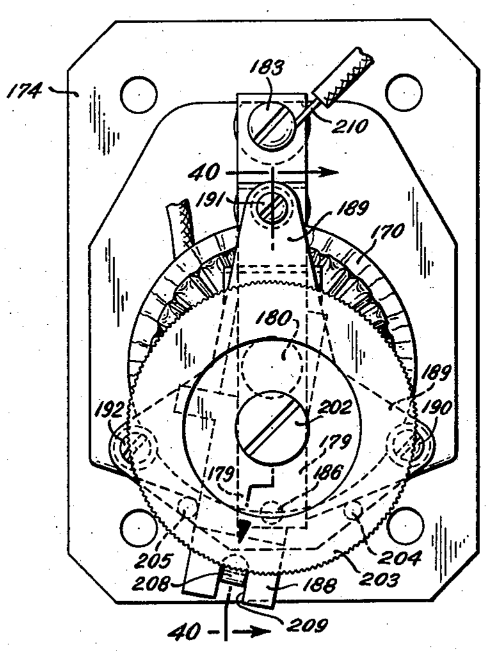
Fig. 38 is a view of an electrical switch which forms another embodiment of this invention, the mounting means for one of the electrical contacts thereof being shown in one extreme position of pivotal movement whereat the two electrical contacts as depicted in this embodiment are mutually engaged.

The snap-acting mechanism of this embodiment further includes spring member 179. It will be noted that in this embodiment, spring member 179 is a member separate from snap-acting member 170 but operatively connected thereto to be actuated thereby. As the snap-acting mechanism snaps from said first condition to said second condition, stud 176 engages spring member 179 and presses the adjacent portion thereof against boss 180. Spring member 179 is secured to base 174 by means of column 172 and a screw 183 as best shown in Figs. 39 and 40. Spring member 179 is formed of springy material such as described for the previous embodiments, and has a high width-to-thickness ratio. Accordingly, spring member 179 is flexible in a plane perpendicular to its width and is substantially non-flexible in the plane in which spring member 179 lies. The angular relation of the substantially non-flexible plane is approximately 90° with respect to the plane in which spring member 179 is readily flexible. Boss 180 is formed of electrically insulating material and is molded in base 174 or otherwise fixedly secured with respect thereto.

Spring member 179 carries at its free end an electrical contact 186 for cooperation with another electrical contact 187. Contact 187 is secured to a member 188 by suitable means such as screws, rivets or the like. Member 188 is formed of a suitable electrically insulating material. When the snap-acting mechanism is in said first condition, contact 186 is biased away from contact 187; and when the snap-acting mechanism is in said second condition, stud 176 is pressed against spring member 179 to flex it whereby contact 186 is biased into engagement with contact 187.

A mounting plate 189 is secured to the upper portion of each of columns 171, 172 and 173 by means of a headed screw 190, 191 and 192, respectively, each of which passes through an adjacent aperture in mounting plate 189 and in tightened threaded engagement with the respective column. A screw 193 is threaded through an aperture in mounting plate 189 and fixedly retained by lock nut 194. An aperture 195 is provided in a spring lever 196 adjacent the lower end of screw 193 whereby stud 176 engages screw 193 in its extreme right-hand position as viewed in Fig. 40, whereby screw 193 serves to limit right-hand movement of stud 176 as viewed in Fig. 40. At its fixed end lever 196 is secured to mounting plate 189 by means of a pair of screws 197, 197 (one of which is not shown). Each of screws 197, 197 passes through an aperture in mounting plate 189, through an aperture in member 198, through an aperture in lever 196 and into tightened threaded engagement with member 199 to draw member 199 upwardly toward member 198 to secure the lever therebetween.

An internally threaded flanged bushing 201 is secured in an aperture in mounting plate 189 by means of nut 200. A threaded screw 202 is adjustably secured to knob 203 and disposed in interfitting engagement with threaded bushing 201. Accordingly, rotation of knob 203 in opposite directions concomitantly rotates screw 202 in bushing 201 whereby the lower end of screw 202 alternately depresses and releases the relatively adjacent portion of lever 196. It will be apparent that downward movement of screw 202 against the adjacent portion of lever 196 biases the free end of lever 196 downwardly against snap-acting disc 170 to snap the disc from said first condition to said second condition. When screw 202 is retracted, the bias exerted by lever 196 will be decreased to permit disc 170 to snap back to its biased position at which it is in said first condition. Accordingly, it is seen that rotation of knob 203 is effective, under corresponding applied forces in the appropriate direction, to snap disc 170 between said two conditions thereby to snap contact 186 into and out of engagement with contact 187.

A member 207 is fixedly secured by any suitable means to knob 203 for pivotal movement therewith. A leg 208 provided by member 207 is loosely disposed in a relatively adjacent slot 209 in member 188. Member 188 is pivotally mounted about boss 180 and, by virtue of member 207 and its connection with member 188, pivotal movement of knob 203 effects concomitant pivotal movement of member 188 in the same direction. Pivotal movement of member 188 may be limited by the alternative engagement of member 188 with stops 204 and 205; both of which stops may be molded on base 174 or otherwise fixed thereto. As is apparent from Figs. 41 and 43 slot 209 extends longitudinally to a sufficient length that even though leg 208 and member 188 pivot about non-aligned axes, leg 208 will not bind in slot 209 but will slide therein.

Electrical lead 210 may be electrically connected to contact 186 by inserting an end thereof under the head of screw 183 before tightening this screw down. Lead 211 may be electrically connected to contact 187 by soldering at 212.

It is apparent that when knob 203 is rotated under a corresponding applied force to snap snap-acting disc 170 from said first condition to said second condition, member 188 will swing contact 187 laterally relative to contact 186 in an arcuate path and in a direction at a substantial angle to the direction of make and break contact 186 with respect to contact 187. Of course, the reverse holds true during rotation of knob 203 under a corresponding applied force to snap snap-acting disc 170 from said second condition back to said first condition.

Figure 42:
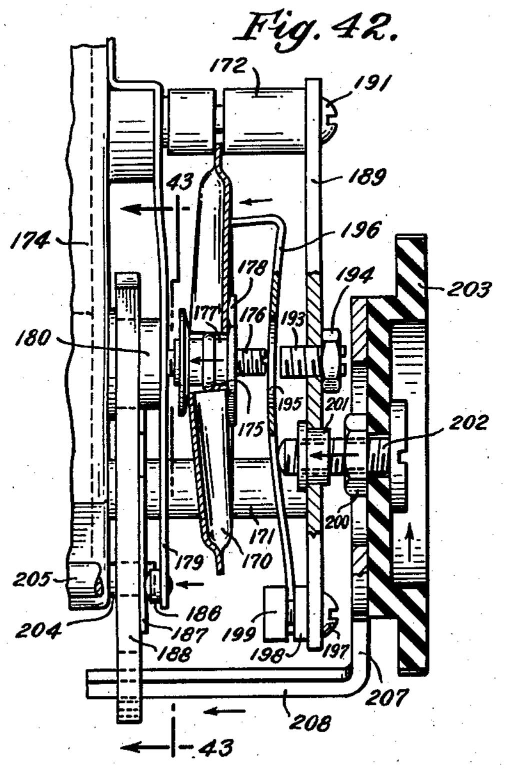
Fig. 42 is a side view partly in section and corresponding to Fig. 40, but showing the parts in the position at which the mounting means for one of the electrical contacts is in the opposite extreme position from that shown in Figs. 38–41 and at which the two electrical contacts depicted in this embodiment are mutually engaged.

Figs. 43–47 show the relative positions of member 188, the contact-carrying end of spring member 179 and contacts 186 and 187 during operation of the switch. Fig. 43 shows the parts in full lines with member 188 and contact 187 carried thereby in one extreme position of pivotal movement. It is noted that contacts 186 and 187 will be engaged as shown in Fig. 42 when the parts are in the relative position shown in full lines in Fig. 43. Fig. 43 also shows the position of member 188, contact 187 and leg 208 in broken lines when these parts are in the opposite extreme position of pivotal movement. It is noted that contacts 186 and 187 will be disengaged as shown in Figs. 39 and 40 when member 188 is in the broken-line position shown in Fig. 43. Upon pivotal movement of member 188 from the broken-line position shown in Fig. 44 to the opposite extreme position, contact 186 will be snapped into engagement with contact 187 when the pivotable parts reach the full-line position shown in Figs. 44 and 46. During continued movement of the pivotable parts to the extreme position shown in broken lines in Fig. 45, contacts 186 and 187 will, of course, remain mutually engaged. During pivotal movement of member 188 in the opposite direction and from the extreme pivotal position shown in broken lines in Fig. 45, contact 186 will be snapped out of engagement with contact 187 at substantially the full-line position shown in Figs. 45 and 47. The result, again, is that all of the advantages and novel functions ascribed above with respect to the previously described embodiments are also provided by this embodiment.

First modification (Figs. 48–52)

Figs. 48–52 illustrate a modification which can be applied to and incorporated into switch structure embodying this invention. In the light of the following description it will become apparent that each of the embodiments disclosed herein is susceptible of this modification. However, to avoid unnecessarily complicating this description, only the embodiment shown in Figs. 1–15 has been so modified by way of example.

The parts of this modified switch are or may be substantially identical with those of the embodiment as shown in Figs. 1–15 except as pointed out hereinafter. In this regard, those parts of the modified switch structure shown in Figs. 48–52 which have primed reference numerals are or may be identical with their respective counterparts in Figs. 1–15, these respective counterparts having the same but unprimed reference numerals.

The modified switch structure shown in Figs. 48–52 includes a member 50′ which may or may not be a spring member as explained above with respect to member 50 of the embodiment shown in Figs. 1–15. Member 50′ carries electrical contacts 53′ and 56′ and forms part of the snap-acting mechanism 30′ whereby member

50' snaps in or along its flexible plane upon snapping of the snap-acting mechanism in the manner set forth with respect to the counterparts of the embodiment of Figs. 1–15. However, according to this modification, two additional spring members 220, 221 are provided, each of which has the same flexibility characteristics as those ascribed to the spring members of the previously described embodiments. Spring members 220 and 221 are mounted for movement with member 222 by means of a rivet 224 or its equivalent which clamps an end portion of spring member 220 between blocks 225 and 226 and clamps an end portion of spring member 221 between blocks 226 and 227. It will be noted that member 222 is or may be identical with member 38 of the embodiment as shown in Figs. 1–15 except that it is cut away as indicated at 223 to avoid interference between it and adjacent structure. Each of blocks 225, 226 and 227 is formed of suitable electrically insulating material whereby spring members 220 and 221 are electrically insulated from each other.

Each of spring members 220 and 221 may be resiliently biased into engagement with that one of electrical contacts 229 and 230 to which it is adjacent as shown in the drawing. In this manner, spring members 220 and 221 remain in electrical connection with contacts 229 and 230, respectively, throughout operation of this switch. Contact 229 is supported by base 31' by means of a screw 231 which also clamps a lead 232 in electrical engagement with this contact. Likewise, contact 230 is mounted on base 31' by means of a screw 233 which also clamps a lead 234 in electrical engagement with this contact. It will be clear, then, spring members 220 and 221 are mounted for movement relative, respectively, to each of the contacts 53', 229 and 56', 230.

In operation, movement of member 222 from the full-line to the dotted-line position shown in Fig. 48 is effective to move contacts 53' and 56' relative to base 31' in the same manner that corresponding movement (in the embodiment of Figs. 1–15) of member 38 effects movement of contacts 53 and 56 relative to base 31. In the full-line position of the parts in Figs. 48–50, however, contact 53' electrically connects with and presses against the adjacent portion of spring member 220 whereby this latter portion is biased against contact 229. Accordingly, when in this position, contact 53' is electrically connected through spring member 220 with contact 229, and, of course, contact 56' is electrically disconnected from contact 230. When member 222 is moved to the dotted-line position shown in Fig. 48 thereby effecting snapping of contacts 53' and 56' to the position shown in Figs. 51 and 52, contact 56' electrically connects with and presses against the adjacent portion of spring member 221 whereby this latter portion is biased against contact 230. Accordingly, when in this position, contact 56' is electrically connected through spring member 221 with contact 230, and, of course, contact 53' is electrically disconnected from contact 229.

It will be clear that, with this modification, movement of member 222 from the full-line to the dotted line position shown in Fig. 48 is also effective to move or swing spring members 220 and 221 about stud 32' and laterally relative to each of contacts 53', 56', 229 and 230. Since spring members 220 and 221 are laterally movable relative to contacts 53', 56', 229 and 230 in opposite directions along a path lying at a substantial angle with respect to the direction of relative movement of these contacts during make and break thereof, it is clear that the advantages and novel characteristics ascribed above with respect to the previously described embodiments are also provided by this modification. In addition, with this modification the problem of electrically connecting contacts 229 and 230 in the desired circuitry is simplified since these latter contacts (in contradistinction to contacts 54 and 57 of the embodiment as shown in Figs. 1–15) are fixed relative to base 31'. For example, the use of pigtails leading to contacts 229 and 230 is avoided. Furthermore, due to the resiliency and/or "take-up" of each of spring members 220 and 221 in its respective plane of flexibility, the tendency for contacts 53' and 56' to bounce when snapped into electrical connection with contacts 229 and 230, respectively, is materially reduced. It will be obvious that in an installation where none of the pressure by which the contacts are held closed can be sacrificed, intermediate spring members 220 and 221 can be arranged to be biased against contacts 229 and 230, respectively, immediately adjacent the place where the intermediate contacts are respectively engaged by contacts 53' and 56'. It will be equally clear that by this latter arrangement, the reduction of contact bounce will be correspondingly relinquished.

*Second modification (Figs. 53–62)*

It is well known in the art of snap-acting switches of the general type described herein that, unless accommodation is provided therefor, a contact which is snapped out of engagement with a cooperating contact will ordinarily creep or tend to creep away from the cooperating contact a substantial distance before snap movement ensues. Among the disadvantages and deleterious effects of this creep are arcing between the contacting surfaces of the contacts and consequent deterioration of these surfaces. With a snap-acting switch which incorporates a spring member as described earlier in this description, this creep during movement of the snappable contact in one direction can be eliminated by decreasing the gap between the open and closed positions of these contacts an amount equal to the range throughout which the snappable contact would otherwise creep in that direction. However, this has the accompanying effect of decreasing, by the same amount, the extent of snap motion of the snappable contact in the opposite direction. If the creep in the said opposite direction were to be eliminated in the same manner, snap motion in said one direction would likewise be decreased the same amount. The modification now to be described, along with the provision of the advantages ascribed above with respect to the previously described embodiments, provides the added feature of avoiding this creep effect while permitting the snappable contact to snap throughout its full range of snap motion in both of its opposite directions of movement, and this when the switch is of the double-throw type as well as the single-throw type.

According to the modification now to be described at least two electrical contacts are provided, and the spring member and one of these contacts are mounted for urging the contacting surfaces of the two contacts together in a direction at an oblique angle with respect to at least one of the contacting surfaces. The result is that laterally relative movement between the two contacts is effected and, at the same time, the snap-acting mechanism is stressed in a direction to cause snapping of the snap-acting mechanism. By way of example, Figs. 53–62 depict the manner in which the embodiment illustrated in Figs. 1–15 may be altered to incorporate this modification. The modification shown in Figs. 53–62 will be or may be identical to the embodiment shown in Figs. 1–15 except as pointed out hereinafter. In this regard, the parts shown in Figs. 53–62 which are provided with double-primed reference numerals are or may be identical to their respective counterparts in the embodiment shown in Figs. 1–15.

According to this modification, contacts 240 and 242, which correspond to contacts 54 and 57 of the embodiment of Figs. 1–15, provide inclined contacting surfaces 241 and 243, respectively. As noted in Figs. 54–62, surfaces 241 and 243 lie at an oblique angle to the planes or directions in which spring member 50'' is flexible and non-flexible, and these surfaces are substantially parallel with each other. Member 244 is or may be identical with member 38 of the embodiment shown in Figs. 1–15 except that member 244 may be provided with a recess or cut-away portion 245 to accommodate contact 242 (see particularly Figs. 54 and 55).

When member 244 is swung downwardly in the direction of the arrow as viewed in Fig. 53, contacts 240 and 242 will move from the broken-line toward the dotted-line position as shown in Fig. 59 and contact 240 will be urged against contact 53″ in a direction parallel with that of the arrow in the upper left-hand portion of Fig. 59. As is apparent from Fig. 59, the direction in which contact 240 and contact 53″ are urged together is at an oblique angle with respect to surface 241 of contact 240. This urging of contacts 240 and 53″ against each other results from the continuus decrease in the effective height of contact 240 relative, for example, to a point on the base 31″ directly below contacts 53″ and 56″ during the movement of contact 240 from the full-line to the broken-line position of Fig. 59. During the movement of contact 240 from the broken-line to the full-line position shown in Fig. 59, contact 53″ will move from the uppermost, broken-line position to the intermediate, broken-line position shown in Fig. 59. It will be clear that during the above-described movement of contact 240, contacts 240 and 53″ will have moved laterally relative to each other. Also, as contact 53″ moves from the upper most, broken-line position to the intermediate, broken-line position shown in Fig. 59, the adjacent portion of spring member 50″ will have moved the same amount and in the same direction to stress the snap-acting mechanism in a direction to cause snapping of the snap-acting mechanism. With contact 240 continuing to move in the direction of the arrow in the upper left-hand portion of this figure, the snap-acting mechanism will be snapped quickly to flex or snap contact 53″ out of engagement with contact 240 and qnickly to flex or snap contact 56″ into engagement with contacting surface 243 of contact 242. Fig. 59 shows the parts in full lines immediately after this snapping of the snap-acting mechanism.

It will be apparent then that snapping of the snap-acting mechanism resulting in snapping of contact 53″ to the full-line position shown in Fig. 59 is accomplished under the combined influence of cam 64″ and the urging of the contacting surfaces of contacts 240 and 53″ against each other. Since the effective height of contact 240 continuously decreases during movement from the broken-line to the full-line position shown in Fig. 59, creep of contact 53″ away from contact 240 is at least partially taken up. In fact, so long as contact 240 continues to be urged against contact 53″ to just beyond the point at which the latter snaps away from contact 240, it is clear that creep of contact 53″ away from contact 240 is impossible. As will be clear, the effectiveness of cam 64″ in snapping of the snap-acting mechanism as compared to that due to urging of contacts 240 and 53″ against each other may be varied as desired.

Immediately after snapping of the snap-acting mechanism, movement of contacts 240, 242, 53″ and 56″ takes place from the broken-line to the full-line positions shown in Fig. 60.

Since contacts 240 and 242 are fixed with respect to each other and when the spacing between contacting surfaces 241 and 243 as measured in the direction of movement of contacts 53″ and 56″ is sufficient to permit snapping of the snappable contacts through the full range which they are capable of snapping (in both directions), it will be clear that contact 53″ will snap through this full range. That is, since contacting surfaces 241 and 243 remain spaced apart a distance sufficient to permit snapping of contact 53″ through its full range of snap movement, at the instant when snapping of contact 53″ occurs contacting surfaces 241 and 243 are necessarily so spaced apart.

It will be clear that movement of contacts 240 and 242 in the opposite direction as depicted in Figs. 61 and 62 will effect the same results as ascribed above with respect to Figs. 59 and 60 since the coaction between the parts is then the same but in respectively reverse directions.

It will be apparent that the laterally relative movement between contacts 240 and 53″ and between contacts 242 and 56″ provides the wiping effect between the respectively engaged contacts along with the ensuing advantages and the other advantages as ascribed above with respect to the previously described embodiments.

Depending upon the obliqueness of the angle presented by contacting surfaces 241 and 243 with respect to the direction in which the respective contacts are urged together, the cam 64″ and/or any other actuating means which might otherwise be provided for effecting snapping of the snap-acting mechanism, can be eliminated whereby the snap-acting mechanism would be snapped solely due to the action of the respective contacts being moved against each other. Accordingly, it will be clear that this arrangement, whereby at least one of the contacts presents a contacting surface lying at an oblique angle to the direction in which the contacts are urged together, may be incorporated into any of the previously described embodiments or it may be substituted for the actuating means for the snap-acting mechanism of any of the previously described embodiments. It will be equally clear that in those cases where snapping of the snap-acting mechanism is effected solely by the urging of two contacts together in a direction at an oblique angle with respect to the contacting surface of at least one of the contacts, creep of the contacts away from each other is impossible. Obviously, the angle presented by at least one of the contacting surfaces to the direction in which the contacts are urged together need not remain constant along its respective length, but may vary as desired. Also, depending upon factors such as the operating characteristics to be provided by a particular switch of the double-throw type, corresponding portions of contacting surfaces such as surfaces 241 and 243 need not be but in many instances preferably are parallel with each other.

It will be noted that incorporation of this modification in the switch embodiment of Figs. 1–15 entails simply twisting the two outermost contacts in the manner described.

Another advantage of this modification is that loss or decrease in the pressure exerted by the snappable contact against the contact with which it is associated is counteracted, at least at the initial portion of the actuation which is effective to snap the snap-acting mechanism. Also, incorporation of this modification lessens the criticality of setting or arranging the parts to eliminate creep of one of the contacts away from another.

Numerous variations other than that particularly described with respect to Figs. 53–62 will suggest themselves in the light of this disclosure. By way of example, the surfaces of contacts 53 and 56 of the embodiment shown in Figs. 1–15 could be correspondingly inclined rather than or in addition to modifying the inclination of the surfaces of contacts 54 and 57 in the manner depicted by contacts 240 and 242 in Figs. 53–62.

It will be clear that, during operation of each of the exemplary embodiments and modifications disclosed herein, wiping movement between at least one pair of contacts is continuously effected so long as these contacts are mutually engaged.

In view of the above, it will be seen that the several objects of the invention are achieved and other advantageous results attained.

Dimensions of certain of the parts and movements of certain of the parts have been exaggerated in the drawings for the purpose of clarity of illustration.

As many changes could be made in the above constructions without departing from the scope of the invention, it is intended that all matter contained in the above description or shown in the accompanying drawings, shall be interpreted as illustrative and not in a limiting sense.

I claim:

1. In combination, first means comprising a spring member having a high width-to-thickness ratio; second means comprising a first electrical contact; a second electrical contact carried by said spring member; said spring member being flexible along a path perpendicular to its width for movement of said second contact into and out of engagement with said first contact, said spring member being substantially non-flexible in a direction at right angles to said path; and means mounting said first and second means for movement of one of said first and second means in said direction and laterally relative to the other of said first and second means while said contacts are in engagement with each other.

2. In combination, first means comprising a spring member having a high width-to-thickness ratio, a first electrical contact, second means comprising a second electrical contact, said spring member carrying said first contact and being flexible in opposite directions perpendicular to its width for movement of said first contact into and out of engagement with said second contact, said spring member being substantially non-flexible in opposite directions at right angles to said first-mentioned opposite directions, and means mounting said first and second means for movement of one of said first and second means laterally relative to the other and in said second-mentioned opposite directions while said contacts are in engagement with each other.

3. In combination, first means comprising a first electrical contact and a first spring member carrying a second electrical contact; second means comprising a second spring member; said second spring member being interposed between said first and second contacts; said second contact being adapted to make and break electrical connection through said second spring member with said first contact, each of said spring members having a high width-to-thickness ratio and being readily flexible in a path perpendicular to their widths, each of said spring members being substantially non-flexible in an additional path perpendicular to the path in which it is readily flexible, said additional paths being parallel to each other, and means mounting said first and second means for movement of one of said first and second means laterally relative to the other of said first and second means and along the path in which the spring member of said one means is substantially non-flexible.

4. In combination, a snap-acting means including a spring member having a high width-to-thickness ratio, said spring member being flexible in opposite directions substantially perpendicular to its width and being substantially non-flexible in another direction at an angle to said opposite directions, said snap-acting means being snappable for flexure of said spring member in one of said opposite directions, a first electrical contact, a second electrical contact operatively associated with said spring member for movement into and out of engagement with said first contact in response to flexure of said spring member in said opposite directions, one of said contacts being laterally movable relative to the other under an applied force, at least a portion of the force between said contacts due to said laterally relative movement while said contacts are engaged with each other being resisted by said spring member in said other direction, and means operatively associated with said snap-acting means and movable under said applied force to effect snapping of said snap-acting means during said laterally relative movement.

5. In combination, a snap-acting means including a spring member having a high width-to-thickness ratio, said spring member being flexible in a first plane substantially perpendicular to its width and being substantially non-flexible in a plane substantially perpendicular to said first plane, said snap-acting means being snappable for flexure of said spring member in said first plane, a first electrical contact, a second electrical contact operatively associated with said spring member for movement into and out of engagement with said first contact in response to flexure of said spring member in said first plane, one of said contacts being laterally movable relative to the other under an applied force, at least a portion of the force between said contacts due to said laterally relative movement while said contacts are engaged with each other being resisted by said spring member along said substantially non-flexible plane, and means operatively associated with said snap-acting means and movable under said applied force to effect snapping of said snap-acting means during said laterally relative movement.

6. In combination, a first electrical contact, a second electrical contact, a snap-acting means including a spring member having a high width-to-thickness ratio, said spring member being flexible in opposite directions substantially perpendicular to its width and being substantially non-flexible in another direction at an angle to said opposite directions, said spring member carrying said second contact and being quickly movable in a direction from a first position to a second position when said means is snapped, said second contact being separated from said first contact when said member is at said first position and being engageable with said first contact when said member is at said second position, one of said contacts being laterally movable relative to the other under an applied force and in a direction across the width of said spring member, and means operatively associated with said snap-acting means to effect, under said applied force, snapping of said snap-acting means during said laterally relative movement.

7. In combination, a snap-acting means including a spring member having a high width-to-thicknesss ratio, a first electrical contact and a second electrical contact, said spring member being operatively connected to said second contact and being flexible in a direction substantially perpendicular to its width, said spring member being substantially non-flexible in a direction at an angle to said first-mentioned direction, said snap-acting means being snappable for flexure of said spring member in said first-mentioned direction thereby to snap said second contact in a direction out of engagement with said first contact, and means operatively associated with said snap-acting means and with one of said contacts for moving said one contact laterally relative to the other along a path lying at a substantial angle to said first-mentioned direction and, during said laterally relative movement, to snap said snap-acting means, said first contact, while engaging said second contact during said laterally relative movement, exerting a force component acting on said spring member in said second-mentioned direction.

8. In combination, a snap-acting means including a spring member having a high width-to-thickness ratio, said spring member being flexible along a first plane substantially perpendicular to its width and being substantially non-flexible along a second plane lying at an angle to said first plane, a first electrical contact, a second electrical contact operatively connected to said spring member; said snap-acting means, in one condition, being snappable for flexure of said spring member along said first plane thereby to snap said second contact in one direction out of engagement with said first contact, and, in another condition, being snappable for flexure of said spring member along said first plane thereby to snap said second contact in the opposite direction into engagement with said first contact, one of said contacts being laterally movable under an applied force relative to the other at a substantial angle with respect to said directions, at least a portion of the force between said contacts due to said laterally relative movement while said contacts are in engagement with each other being resisted by said spring member along said second plane, and means operatively associated with said snap-acting means and movable under said applied force to effect snapping of said snap-acting means during said laterally relative movement.

9. In combination, a base, a first electrical contact and a second electrical contact, a snap-acting means mounted on said base and including a spring member having a high width-to-thickness ratio, said spring member being flexible in a direction substantially perpendicular to its width and being operatively connected to move said second contact along a predetermined path with respect to said base into and out of engagement with said first contact in response to snapping of said snap-acting means, said spring member being substantially non-flexible in a direction at an angle to said first-mentioned direction, and means for moving said first contact at a substantial angle to said path and laterally relative to said second contact under an applied force, at least a portion of the force between said contacts due to said laterally relative movement while said contacts are in engagement with each other being resisted by said spring member in said last-named direction, and means operatively associated with said snap-acting means to snap it during said laterally relative movement.

10. In combination, a base, a first electrical contact and a second electrical contact, a snap-acting means moutned on said base and including a spring member having a high width-to-thickness ratio and being flexible in a direction substantially perpendicular to its width in response to snapping of said snap-acting means for movement of said second contact into and out of engagement with said first contact, said spring member being substantially non-flexible in a direction at an angle to said first-mentioned direction and being movable relative to said base under an applied force for movement of said second contact laterally relative to said first contact, at least a portion of the force between said contacts due to said laterally relative movement while said contacts are engaged with each other being resisted by said spring member in said last-named direction, and means operatively associated with said snap-acting means to snap it during said laterally relative movement.

11. In combination; a snap-acting means including first and second means; said first means comprising a first spring member and a first and a second electrical contact; said first electrical contact being mounted for movement by said first spring member; said second means comprising a second spring member interposed between said first and second contacts; each of said spring members having a high width-to-thickness ratio and being flexible in a first plane substantially perpendicular to their width; each of said spring members being substantially non-flexible in a plane substantially perpendicular to said first plane; said snap-acting means being snappable for flexure of said first spring member from one position to another position; said first and second contacts, in one of said positions, being engageable with said second spring member and electrically connected with each other through said second spring member; said first and second contacts, in the other of said positions, being electrically disconnected from each other; one of said means being laterally movable relative to the other under an applied force; at least a portion of the force on said spring members due to said laterally relative movement while said first and second contacts are engaged with said second spring member being resisted by said spring members along their respective, substantially non-flexible planes; and means operatively associated with said snap-acting means and movable under said applied force to effect snapping of said snap-acting means during said laterally relative movement.

12. In combination, a snap-acting means including first means forming a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction from a first position to a second position, second means providing a surface portion engageable with a surface portion of said spring member when the spring member is in said first position and disengaged from said surface portion of the spring member when the spring member is in said second position, said first and second means being mounted for urging said surface portions against each other in a direction at an oblique angle with respect to at least one of said surface portions to move said surface portions laterally relative to each other and to stress the snap-acting means in a direction to cause snapping thereof, at least a portion of the force on said spring member due to said laterally relative movement while said surface portions are mutually engaged being resisted by said spring member in said other direction.

13. The combination as set forth in claim 12 wherein each of said surface portions comprises a contracting surface of an electrical contact.

14. In combination, a snap-acting means including first means forming a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction from a first position to a second position, second means engageable with said spring member when the spring member is in said first position and disengaged from said spring member when the spring member is in said second position; third means movable relative to said first means under an applied force to move said second means laterally relative to at least a portion of said snap-acting means including said spring member; said snap-acting means providing a surface and one of said second and third means providing a surface, at least a portion of said snap-acting means and said one of the second and third means being mounted for urging said surfaces against each other in a direction at an oblique angle with respect to at least one of said surfaces to move said second means laterally relative to said spring member and to stress the snap-acting means in a direction to cause snapping thereof.

15. In combination, a snap-acting means including first means forming a spring member having a high width-to-thickness ratio, said spring member being flexible in a first direction substantially perpendicular to its width and being substantially non-flexible in a second direction substantially at right angles to said first direction, said snap-acting means being snappable for flexure of said spring member in said first direction from a first position to a second position, second means providing a surface engaged with a surface of said spring member when the spring member is in at least one of said first and second positions, and means mounting said first and second means for urging said surfaces against each other in a direction at an oblique angle with respect to at least one of said surfaces to move said surfaces laterally relative to each other and to stress the snap-acting means in a direction to cause snapping thereof.

16. In combination, a snap-acting means including a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction, a first electrical contact, a second electrical contact movable by said spring member from a first position to a second position when said spring member is flexed in said first direction, the contacting surfaces of said contacts being mutually engageable at one of said positions and being mutually separated at the other of said positions, and means mounting said spring member and said first contact for movement relative to each other to urge said contacting surfaces against each other in a direction at an oblique angle with respect to the contacting surface of at least one of said contacts thereby to move said contacting surfaces laterally relative to each other and to stress the snap-acting means in a direction to cause snapping thereof at least a portion of the force between said contacts due to said laterally relative movement of the contacts while mutually engaged being resisted by said spring member in said other direction.

17. The combination as set forth in claim 16 including additional means operatively associated with said snap-acting means and movable under said applied force to aid in effecting snapping of said snap-acting means during said laterally relative movement.

18. In combination, a snap-acting means including a spring member having a high width-to-thickness ratio, said spring member being flexible in a first direction and being substantially non-flexible in response to a force applied thereto in a second direction, a first electrical contact, a second electrical contact operatively associated with said spring member for movement from a first position to a second position in response to flexure of said spring member in said first direction, said contacts being mutually engageable at one of said positions and being mutually separated at the other of said positions, said snap-acting means being snappable for flexure of said spring member in said first direction, one of said contacts being laterally movable relative to the other under an applied force, at least a portion of the force between said contacts due to said laterally relative movement while said contacts are mutually engaged being resisted by said spring member in said second direction, and said snap-acting means being snappable under said applied force during said laterally relative movement.

19. In combination, a snap-acting means including a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction, a first pair of electrical contacts mutually spaced from each other, a second pair of electrical contacts movable by said spring member in opposite directions between a first position and a second position when said spring member is flexed in corresponding opposite directions, each of said contacts providing a contacting surface, one of the contacting surfaces of each of said pairs of contacts being mutually engageable at one of said positions and the other contacting surface of each of said pairs of contacts being mutually engageable at the other of said positions, means mounting said contacts for urging the mutually engageable contacting surfaces against each other in a direction at an oblique angle with respect to the contacting surfaces of at least one of each of said pairs of contacts to move said contacts laterally relative to each other and to stress the snap-acting means in a direction to cause snapping thereof, at least a portion of the force between each contact of one of said pairs when mutually engaged with the respective contact of the other pair due to said laterally relative movement being resisted by said spring member in said other direction.

20. In combination; a base; a spring member having a high width-to-thickness ratio; said spring member being flexible along a first plane substantially perpendicular to its width and being substantially non-flexible along a second plane substantially perpendicular to said first plane; a snap-acting member incorporating said spring member; said snap-acting member comprising a strip of springy material having a high width-to-thickness ratio; a first electrical contact; a second electrical contact carried by said spring member; means mounting said strip for pivotal movement on said base and applying a tension to said strip to warp it to a first condition; said strip, in said first condition, being snappable to a second condition for flexure of said spring member along said first plane thereby to snap said second contact in one direction into engagement with said first contact; said strip, in said second condition, being snappable to said first condition for flexure of said spring member along said first plane thereby to snap said second contact in the opposite direction out of engagement with said first contact; means mounting said strip for pivotal movement in one direction with respect to said base in response to a corresponding applied force to move said second contact in a first corresponding direction laterally relative to said first contact; said strip being pivotal with respect to said base in a direction opposite to said one direction in response to a corresponding applied force to move said second contact laterally relative to said first contact in a corresponding direction opposite to said first corresponding direction; at least a portion of the force between said contacts due to said laterally relative movement while said contacts are engaged with each other being resisted by said spring member along said second plane; and cam means associated with said snap-acting member for snapping the snap-acting member under the corresponding applied force from said first condition to said second condition during the laterally relative movement of said second contact with respect to said first contact in said first corresponding direction; said cam means effecting snapping of said snap-acting means under the corresponding applied force from said second condition to said first condition during the laterally relative movement of said second contact with respect to said first contact in the opposite corresponding direction.

21. In combination; a base; a spring member having a high width-to-thickness ratio; said spring member being flexible along a first plane substantially perpendicular to its width and being substantially non-flexible along a second plane substantially perpendicular to said first plane; a snap-acting member incorporating said spring member; said snap-acting member comprising strip means of springy material having a high width-to-thickness ratio; a first electrical contact, a second electrical contact carried by said spring member; means mounting said strip means on said base and applying a constant tension to said strip means to warp it to a first condition; said strip means, in said first condition, being snappable to a second condition for flexure of said spring member along said first plane thereby to snap said second contact in one direction into engagement with said first contact; said strip means, in said second condition, being snappable to said first condition for flexure of said spring member along said first plane thereby to snap said second contact in the opposite direction out of engagement with said first contact; means pivotally mounted on said base; said means being pivotal in one direction with respect to said base in response to a corresponding applied force to move said first contact in a first corresponding direction laterally relative to said second contact; said means being pivotal with respect to said base in a direction opposite to said one direction and in response to a corresponding applied force to move said first contact laterally relative to said second contact in a direction opposite to said first corresponding direction; at least a portion of the force between said contacts due to said laterally relative movement while said contacts are engaged with each other being resisted by said spring member along said second plane; and cam means associated with said snap-acting member for snapping the snap-acting member under the corresponding applied force from said first condition to said second condition during the laterally relative movement of said first contact with respect to said second contact in said first corresponding direction; said cam means effecting snapping of said snap-acting member under the corresponding applied force from said second condition to said first condition during the laterally relative movement of said first contact with respect to said second contact in the opposite corresponding direction.

22. In combination, a snap-acting means including a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction, a first electrical contact, a second electrical contact movable by said spring member from a first position to a second position when said spring member is flexed in said first direction, the contacting surfaces of said contacts being mutually engageable at one of said positions and being mutually separated at the other of said positions, means mounting said spring member and said first contact for urging said contacting surfaces against each other in a direction at an oblique angle with respect to the contacting surface of at least one of said contacts to move the contacts laterally relative to each other and to stress the snap-acting means in a direction to cause snapping thereof, the contacting surface of said one contact lying at an oblique angle relative to said first direction and relative to said other direction, at least a portion of the force between said contacts due to said laterally relative movement of the contacts while mutually engaged being resisted by said spring member in said other direction.

23. In combination, a snap-acting means including a spring member having a high width-to-thickness ratio, said spring member being flexible in a first direction substantially perpendicular to its width and being substantially non-flexible in another direction at an angle to said first direction, said snap-acting means being snappable for flexure of said spring member in said first direction, a first electrical contact, a second electrical contact movable by said spring member from a first position to a second position when said spring member is flexed in said first direction, the contacting surfaces of said contacts being mutually engageable at one of said positions and being mutually separated at the other of said positions, said contacts being mounted for movement laterally relative to each other under an applied force in a direction in which said spring member is non-flexible, and means movable against a portion of said snap-acting means under said applied force for stressing the snap-acting means in a direction to cause snapping thereof.

24. In combination; a first electrical contact and a second electrical contact; a snap-acting means including a member carrying said first contact; said snap-acting means being snappable to snap said first contact from a first position to a second position; said contacts being mutually engageable when said first contact is in said first position and being mutually disengaged when said first contact is in said second position; and means mounting said member and said second contact for movement relative to each other to urge the contacting surfaces of said contacts against each other in a direction at an oblique angle with respect to the contacting surface of at least one of said contacts thereby to move said contacting surfaces laterally relative to each other while mutually engaged and to stress the snap-acting means in a direction to cause snapping of said first contact from said first position to said second position; said last-named means including a rigid member mounting said second contact whereby the latter is prevented from yielding under the force exerted thereagainst by said first contact when said contacting surfaces are urged together.

25. In combination; a snap-acting means including a spring member having a high width-to-thickness ratio; said spring member being flexible in a first direction substantially perpendicular to its width and being substantially non-flexible in another direction at an angle to said first direction; said snap-acting means being snappable for flexure of said spring member in said first direction; a first electrical contact; a second electrical contact movable by said spring member from the first position to the second position when said spring member is flexed in said first direction; the contacting surfaces of said contacts being mutually engageable at one of said positions and being mutually separated at the other of said positions; and means mounting said spring member and said first contact for movement relative to each other to urge said contacting surfaces against each other in a direction at an oblique angle with respect to the contacting surface of at least one of said contacts thereby to move said contacting surfaces laterally relative to each other while mutually engaged and to stress the snap-acting means in a direction to cause snapping of said second contact from said first position to said second position; said last-named means including a rigid member mounting said second contact whereby the latter is prevented from yielding under the force exerted thereagainst by said first contact when said contacting surfaces are urged together; and at least a portion of the force between said contacts due to said laterally relative movement while said contacting surfaces are mutually engaged being resisted by said spring member in said other direction.

References Cited in the file of this patent

UNITED STATES PATENTS

| | | |
|---|---|---|
| 1,879,349 | Lederer | Sept. 27, 1932 |
| 1,918,491 | Ross | July 18, 1933 |
| 1,925,612 | Snell | Sept. 5, 1933 |
| 1,960,020 | McGall | May 22, 1934 |
| 2,153,297 | Butler | Apr. 4, 1939 |
| 2,537,682 | Ljungfeldt | Jan. 9, 1951 |
| 2,565,790 | Van Ryan et al. | Aug. 28, 1951 |
| 2,573,588 | Miller | Oct. 30, 1951 |
| 2,630,504 | Burch et al. | Mar. 3, 1953 |
| 2,644,052 | Martin | June 30, 1953 |
| 2,697,145 | Winet | Dec. 14, 1954 |
| 2,710,323 | Andrews | June 7, 1955 |
| 2,750,463 | Roeser | June 12, 1956 |
| 2,819,362 | Korsgren | Jan. 7, 1958 |
| 2,825,785 | Taylor | Mar. 4, 1958 |

UNITED STATES PATENT OFFICE

CERTIFICATE OF CORRECTION

Patent No. 2,899,512 August 11, 1959

Lyndon W. Burch

It is hereby certified that error appears in the printed specification of the above numbered patent requiring correction and that the said Letters Patent should read as corrected below.

Column 2, line 59, for "constanly" read -- constantly --; column 3, line 17, for "figures" read -- Figures --; column 4, line 48, strike out "posi-"; column 5, lines 43 and 58, for "figure", each occurrence, read -- Figure --; column 6, line 8, for "Phosphor-" read -- phosphor- --; line 15, for "embodiment" read -- embodiments --; column 8, line 16, for "figure." read -- Figure. --; column 11, line 47, for "figures" read -- Figures --; column 14, line 36, for "Figs. 34-47" read -- Figs. 38-47 --; column 16, line 16, after "break" insert -- of --; column 19, line 17, for "continuus" read -- continuous --; line 18, strike out "the"; same column 19, line 36, for "figure," read -- Figure, --; column 23, line 30, for "moutned" read -- mounted --; line 53, for "width;" read -- widths; --; column 24, line 22, for "contracting" read -- contacting --; column 25, line 10, after "thereof" insert a comma.

Signed and sealed this 26th day of April 1960.

(SEAL)
Attest:

KARL H. AXLINE
Attesting Officer

ROBERT C. WATSON
Commissioner of Patents